United States Patent
Komenczi et al.

(10) Patent No.: US 9,947,134 B2
(45) Date of Patent: Apr. 17, 2018

(54) SYSTEM AND METHOD FOR GENERATING A DYNAMIC THREE-DIMENSIONAL MODEL

(71) Applicant: Zinemath Zrt., Budapest (HU)

(72) Inventors: Norbert Komenczi, Gyongyos (HU); Balazs Oroszi, Vac (HU); Gergely Balazs Soos, Jaszbereny (HU)

(73) Assignee: Zinemath Zrt., Budapest (HU)

( * ) Notice: Subject to any disclaimer, the term of this patent is extended or adjusted under 35 U.S.C. 154(b) by 379 days.

(21) Appl. No.: 14/418,325

(22) PCT Filed: Jul. 29, 2013

(86) PCT No.: PCT/HU2013/000078
§ 371 (c)(1),
(2) Date: Jan. 29, 2015

(87) PCT Pub. No.: WO2014/020364
PCT Pub. Date: Feb. 6, 2014

(65) Prior Publication Data
US 2015/0161818 A1 Jun. 11, 2015

(30) Foreign Application Priority Data
Jul. 30, 2012 (HU) .................................... 1200451

(51) Int. Cl.
*G06T 17/00* (2006.01)
*H04N 13/02* (2006.01)

(52) U.S. Cl.
CPC ........... *G06T 17/00* (2013.01); *H04N 13/025* (2013.01); *H04N 13/0239* (2013.01); *H04N 13/0271* (2013.01); *H04N 13/0296* (2013.01)

(58) Field of Classification Search
CPC .. G06T 17/00; H04N 13/0239; H04N 13/025; H04N 13/0271

(Continued)

(56) References Cited

U.S. PATENT DOCUMENTS

| 6,020,931 A * | 2/2000 | Bilbrey .................. H04N 5/222 348/584 |
| 8,031,933 B2 | 10/2011 | Se et al. |

(Continued)

OTHER PUBLICATIONS

European Patent Office, International Search Report and the Written Opinion of the International Searching Authority of corresponding PCT/HU2013/00078, dated Jan. 8, 2014.

(Continued)

*Primary Examiner* — Jeffery Williams
(74) *Attorney, Agent, or Firm* — Wood Herron & Evans LLP

(57) ABSTRACT

The invention is a system for generating a dynamic three-dimensional model of a space, comprising a camera module (100) comprising an optical sensor adapted for recording image information of the space, and a depth sensor adapted for recording depth information of the space, and a modelling module (300) adapted for generating a dynamic three-dimensional model of the space on the basis of the image information and the depth information. In the system according to the invention the image information with the optical sensor and the depth information with the depth sensor are recorded at a plurality of discrete times. The system according to the invention comprises a synchronisation signal generating module determining synchronised with each other the discrete times associated with the image information and the discrete times associated with the depth information. In the system according to the invention the dynamic three-dimensional model is generated at a plurality of the discrete times of the image information and of the depth information, and at each of the discrete times the image information and the depth information associated with the given discrete time are integrated into the dynamic three-dimensional model on the basis of position and orientation of the camera module (100) at the given discrete (Continued)

time, which position and orientation are determined by the modelling module (300) on the basis of information provided by the sensors of the camera module (100) at the discrete times in an observation window. The invention is, furthermore, a method for generating a dynamic three-dimensional model of a space.

11 Claims, 8 Drawing Sheets

(58) Field of Classification Search
USPC .......................................................... 348/43
See application file for complete search history.

(56) References Cited

U.S. PATENT DOCUMENTS

| 2004/0105573 | A1* | 6/2004 | Neumann | G06T 17/00 |
| | | | | 382/103 |
| 2005/0207617 | A1* | 9/2005 | Sarnoff | G01S 5/04 |
| | | | | 382/103 |
| 2009/0299184 | A1* | 12/2009 | Walker | G01S 7/52046 |
| | | | | 600/447 |
| 2012/0237111 | A1* | 9/2012 | Sinha | G06K 9/469 |
| | | | | 382/154 |
| 2013/0215132 | A1* | 8/2013 | Fong | G06F 3/0317 |
| | | | | 345/582 |

OTHER PUBLICATIONS

Lionel Heng et al, "Real-time photo-realistic 3D mapping for micro aerial vehicles," Intelligent Robots and Systems (IROS), 2011 IEEE/RSJ International Conference on, IEEE, Sep. 25, 2011, pp. 4012-4019, Abstract Only.

Izadi et al., "KinectFusion: Real-time 3D Reconstruction and Interaction Using a Moving Depth Camera," Oct. 16, 2011, pp. 1-10, retrieved from the Internet: http://research.microsoft.com/pubs/155416/kinectfusion-uist-comp.pdf.

Andrew Davison, "Kinect chapter 6. The Tilt Motor, LED, and Accelerometer," Nov. 1, 2011.

Greg Passmore,"Lidar in television," Proc of SPIE, vol. 6016, 2005, Abstract Only.

* cited by examiner

SYSTEM AND METHOD FOR GENERATING A DYNAMIC THREE-DIMENSIONAL MODEL

This application claims priority, under Section 371 and/or as a continuation under Section 120, to PCT Application No. PCT/HU2013/000078, filed on Jul. 29, 2013, which claims priority to Hungarian Application No. PI200451, filed on Jul. 30, 2012.

TECHNICAL FIELD

The invention relates to a system and method for generating a dynamic three-dimensional model.

BACKGROUND ART

Currently, 3D modelling and the application of full or partial CGI (Computer Generated Imagery) objects, and furthermore that of various 3D effects gain increasing popularity in all areas of film making. The procedure usually applied in the film industry is the subsequent supplementing, even with 3D objects, of the film material recorded on location, and the use of image manipulation techniques, for which the 3D modelling of the real environment, and in this regard the knowing of the current position and viewing direction of the original recording camera are necessary. These procedures are supported by several products on the market, but they have a limited use and/or are very expensive.

Nowadays, the film industry increasingly develops in the direction of actively using the data and structure of the space (environment). The already available approaches may even offer a stereo 3D vision to the spectator in the case of both TV and the movies. No matter if 2D or 3D imaging is involved, the records of course always reflects the 3D world, even if the given film or animation is about a virtual world. In this field, many technical solutions by which a dazzling vision can be conjured up in front of the spectators' eye.

If during the shooting, not only pictures are recorded, but they are also synchronised with the spatial locations of the objects in the real world, as well as the current position and orientation of the camera in space, even virtual 3D, computer-generated and model-based, objects can be inserted simply and quickly, or other special effects may be applied during the post-production of the film. Of course, the manufacturers are making efforts to meet these requirements, but known solutions are burdened with a number of problems for which no complex solution has been found so far. The apparatuses developed for this purpose available on the market are very expensive, and therefore only used for high budget films, or they are inaccurate and therefore cannot be used for professional purposes. Furthermore, they generally require considerable post-production (which represents a high cost by way of example in the case of a film, because of the high number of post-production hours), and therefore they are not adapted for real-time processing (like, for example, a live TV report) either. In addition, the currently available apparatuses generally have a large (extensive) size. For the synchronised recording of the 3D data of the world, i.e. the environment surrounding the recording apparatus, the acquisition of spatial information (data collection) must be carried out on the one hand, and the on-going tracking of the spatial position of the moving camera must be provided for on the other hand. The treatment of these two problems can be combined using the analogy of the related problem family SLAM (Simultaneous Localisation and Mapping) known from robotics.

For mapping the space (the environment) and recording the spatial information, several solutions are known, and for this purpose a number of sensors based on various measuring principles are available. In this field, the most popular remote sensor is the so-called LIDAR (Laser Imaging Detection and Ranging) or laser ranging sensor, which generally measures the distance of the objects in the environment in the nodes of a two-dimensional grid, thereby providing a depth image from the environment. The resolution of laser ranging sensors is heavily limited, and most LIDARs only measure in one plane. Even the more developed and more expensive units (like for example laser ranging sensors with a rotating head) provide data about the environment with a resolution of max. 32 to 64 lines. Laser ranging does not provide data about the trajectory of the recording apparatus.

There are also so-called Kinect-based solutions (S. Izadi et al.: KinectFusion: Real-time 3D Reconstruction and Interaction Using a Moving Depth Camera, in *Proceedings of the 24th annual ACM symposium on User Interface Software and Technology*, pp. 559-568, 2011); the film industry has also discovered for itself the so-called Kinect sensor adapted also for identifying the space, but the film-related application of the apparatus according to the document and the solutions based on the apparatus are very much limited. The apparatus according to the document may only be used indoors and within a distance of approx. 5 to 8 meters. For generating the 3D world model, i.e. a static voxel model, and for tracking the camera position, it uses the depth data, and the optical information based distance estimation detailed above is not applied. The world model is developed and made more detailed by the continuously obtained fresh data. The world model may also be provided with texture. Virtual objects obtained e.g. through computer modelling may also be integrated into the world model generated by an algorithm according to the document. In the Kinect sensor, the RGB camera (colour video camera) and the depth sensor are arranged on different optical axes, shifted in relation to each other, and therefore the RGB image recorded by the Kinect sensor and the point cloud are not entirely in alignment. The Kinect sensor does not provide information about its own movement, and such systems available on the market only operate with a standing, fixed camera.

Several approaches are known also for tracking the spatial position of a moving camera. From a technical aspect, two kinds of spatial camera position identification methods are broadly used in the film industry. One method involves determining the camera position by the software analysis of its two-dimensional RGB image. This method does not require a lot of facilities, and therefore it is low priced, but it is very much labour intensive, and in many cases not sufficiently accurate. Another method involves determining the camera position independently of the camera, by means of fixed external sensors. This position identification method requires the preliminary installation and calibration of the sensors and the co-ordinated work of several people, and therefore the related cost is high.

The approach to perform the software analysis of the two-dimensional RGB image of a camera is demonstrated below. The two-dimensional images comprise well-identifiable points (for example corner points, contour lines) which can be seen and automatically tracked in many consecutively made images. By making use of their inter-related displacement, i.e. the parallax, taking into consideration the optical characteristics of the camera, the orientation and movement trajectory of the camera (i.e. 6 degrees of freedom trajectory, the position and the orientation as a function of time), as well as the spatial locations of the tracked points can be reconstructed. This approach involves the above mentioned image processing based spatiality measurement, because if the object locations are known, then the camera positions can also be calculated. The advantage of this method is that the execution only requires the normal RGB image recorded by the camera and the analysing software. However, a serious disadvantage is its slowness. In the case of an HD (high definition) image of 1920×1080 pixel resolution, depending on the speed of the computer used for execution of the method, for a simple recording comprising points which can be identified easily, a period equivalent to many times the length of the footage is necessary for reconstructing the trajectory of the camera. In the case of a more complicated recording for which considerable human intervention may also be required, the reconstruction period may even be several hundred times this figure. For the processing of one minute of recording, i.e. for determining the trajectory of the camera, even one day may be needed. A further disadvantage of the method is that only the picture of a camera moving in space can be used for it. It may not be applied either with a fixed (for determining the fixed position), or with a panning camera image. In a so-called 'green screen' studio environment, only limited use is possible, because there are no trackable and well-identified points in the homogeneous background. A further problem of the method is that it is necessary to remove from the image somehow, characteristically by a hand-drawn and animated mask, the elements (for example vehicles, people) which are in motion compared to the reference points, because if the points thereon are also tracked by the software, this will result in an erroneous trajectory of the camera. In addition, the so-called pseudo-feature points, i.e. the not well usable identified points like reflections, rounded edges or the so-called T-nodes can be a serious problem, and generally demand manual correction. The applied identified and tracked points only provide low resolution, ad hoc information about the space, and on this basis the model of the space may only be generated by considerable human intervention.

For tracking the camera, fixed installed external sensors fitted independently of the camera can also be applied, and they may be of mechanical or optical type.

The mechanical methods are based on a mechanical sensor environment installed on mechanised camera manipulators, cranes, dollies, and camera heads. The sensors calculate the current position of the camera from displacements measured on the articulation joints of the camera manipulating apparatus. The use of these mechanical means is difficult, and they have a relatively low accuracy. Their use may not be matched to the application of hand-held cameras or cameras moved without special camera manipulators, and therefore the utilisation of a mechanical sensor environment is very expensive. The sensor environment does not provide information on the structure of the space.

The basis for the optical method adapted for tracking a camera is that several external optical sensors monitor continuously the markers fitted on the recording camera, i.e. their movement compared to the sensors are measured. The more optical sensors are used, the more accurately the position of the recording camera can be determined. Practically, this method provides real-time data supply, it can be used with a stationary or panning camera, and also in a 'green screen' environment, since it does not require identified and tracked points in the environment. It is a disadvantage that implementation is very costly. Not only the hardware environment applied in the method is expensive, but the installation and calibration of the system also demand the work of several people, and therefore this solution is characteristically used in a studio environment, with fixed installation. When shooting on an external location, the sensor environment should be built up and calibrated at each filming location, followed by the dismounting of the sensor environment. A further disadvantage of this solution is that it only monitors and specifies the camera position, and does not register any data about the structure of the space, and demands that a specified part of the sensors see the tracked camera continuously.

In U.S. Pat. No. 8,031,933 B2 an apparatus for generating a three-dimensional model of the scanned space is disclosed. The recording unit of the apparatus comprises an RGB camera, a stereo camera, a depth sensor and a tilt sensor fixed to the recording unit. The apparatus according to the document generates the three-dimensional model of the space seen by it in a way that it uses information from several sensors of the recording unit. It synchronises the data originating from each sensor by means of timestamps, and furthermore tracks the position and the orientation of the camera, displaying the three-dimensional model and subjecting it to further analysis and post-processing.

In US 2010/0118122 A1 an apparatus is disclosed for generating a three-dimensional model of the part of the space investigated by the sensors in a way that the depth information and the optical recordings are combined. In the apparatus according to the document, the optical camera and the depth sensor may be arranged along one optical axis. After rendering, the processed data are shown on a display.

The system described in U.S. Pat. No. 7,583,275 B2 generates a three-dimensional model of the environment on the basis of depth data, and while recording the depth data, it continuously tracks the position and orientation of the recording apparatus (the orientation by means of an inertial sensor), projecting the image obtained from the optical sensors to the three-dimensional model, making use of the data provided by the tracking, and displaying the so textured three-dimensional model.

The solution described in U.S. Pat. No. 6,160,907 is adapted for constructing a three-dimensional model from the real elements stemming from the environment detected by the recording units and from further virtual elements. Apparatuses adapted for generating a three-dimensional model are disclosed in US 2011/0134220 A1 and US 2008/0246759 A1. A similar apparatus is discloses in U.S. Pat. No. 7,215,430 B2, in which the recording unit comprises an optical camera in addition to the LIDAR supplying depth data. A solution making use of depth data is described in U.S. Pat. No. 7,113,183 B1. In US 2008/0240502 A1 a solution is disclosed, in which a three-dimensional depth map is prepared on the basis of image information obtained optically. In US 2012/0013710 A1 a system adapted for generating a three-dimensional model is disclosed, which also comprises an interconnected space scanner and a two-dimensional sensor. According to the document, the three dimensional model is generated on the basis of the data of the space scanner and the two-dimensional sensor. The distance data of the space scanner are supplemented and improved by distance data obtained from two further cameras.

Solutions adapted for generating three-dimensional models are disclosed in US 2008/0260238 A1, US 2009/0322745 A1, U.S. Pat. No. 7,822,267 B2 and U.S. Pat. No. 7,928,978 B2.

A solution aimed at tracking camera motion is disclosed in U.S. Pat. No. 7,956,862 B2. Solutions related three-dimensional modelling are disclosed in U.S. Pat. Nos. 6,072,496, 6,124,864, 6,208,347 B1, 6,310,620 B1, 6,429,867 B1, 6,853,373 B2, 7,103,211 B1, 7,181,363 B2, US 2009/0080036 A1, U.S. Pat. No. 7,586,489 B2, US 2010/0209013 A1, U.S. Pat. No. 7,974,461 B2, US 2011/0115792 A1, US 2011/0274343 A1, U.S. Pat. No. 8,085,388 B2 and WO 2010/130245 A1

In L. Heng, G. H. Lee, F. Fraundorfer and M. Pollefeys: Real-Time Photo-Realistic 3D Mapping for Micro Aerial Vehicles, in: 2011 IEEE/RSJ International Conference on *Intelligent Robots and Systems* (*IROS*), pp. 4012-4019, 2011 a 3D modelling approach is disclosed in which depth information is constructed based on stereo images. During the development of a 3D model, the position and orientation of the camera is computed based on sensor information of the previous and current frames of the stereo images.

Since also according to the description above, the film industry is strongly committed to 3D, i.e. uses 3D modelling and 3D imaging actively, the need has emerged for a compact and efficient system which is able to record the image and range information of the investigated space, and preferably to display this information in almost real-time, by which the recorded depth data can be handled and processed, synchronised with the already recorded pictures, and a direct feedback can be given about them, with the tasks above solved more efficiently than by the prior art solutions.

DESCRIPTION OF THE INVENTION

The primary object of the invention is to provide a system and method for generating a dynamic three-dimensional model of a space (a part of the space or a space part), which are free of the disadvantages of prior art solutions to the greatest possible extent.

A further object of the system and method according to the invention is to apply more efficient processing than the known solutions, preferably filtering and probability estimation, to provide more accurate data about the structure of the space than the known solutions.

The system according to the invention also records depth information in real-time, in addition to the image (optical) information. In addition to the application in the film industry, the system according to the invention may be useful in many other areas as well (safety engineering, military technology, industrial automation, etc.), but the solution basically focuses on meeting the requirements of the film industry and eliminating the problems arising therein.

The system according to the invention satisfies many important conditions which are perhaps not obvious at first sight, in order to arrive at a useful solution: the installation of the system is simple and fast. In some embodiments, it provides an approximate visual feedback about the measured 3D data to the operator principally in real-time during the shooting. The weight of the camera module is characteristically not more than a few kilograms (i.e. it is compact), it may have appropriate 3D accuracy in the case of offline or even online processing for making advanced HD recordings, and furthermore it can be applied not only indoors, under controlled lighting conditions and limited distances, but also outdoors under more complicated environmental conditions.

The objects of the invention can be achieved by the system according to claim 1 and the method according to claim 11. Preferred embodiments of the invention are defined in the dependent claims.

BRIEF DESCRIPTION OF THE DRAWINGS

Preferred embodiments of the invention are described below by way of example with reference to the following drawings, where.

MODES FOR CARRYING OUT THE INVENTION

Figure 1:
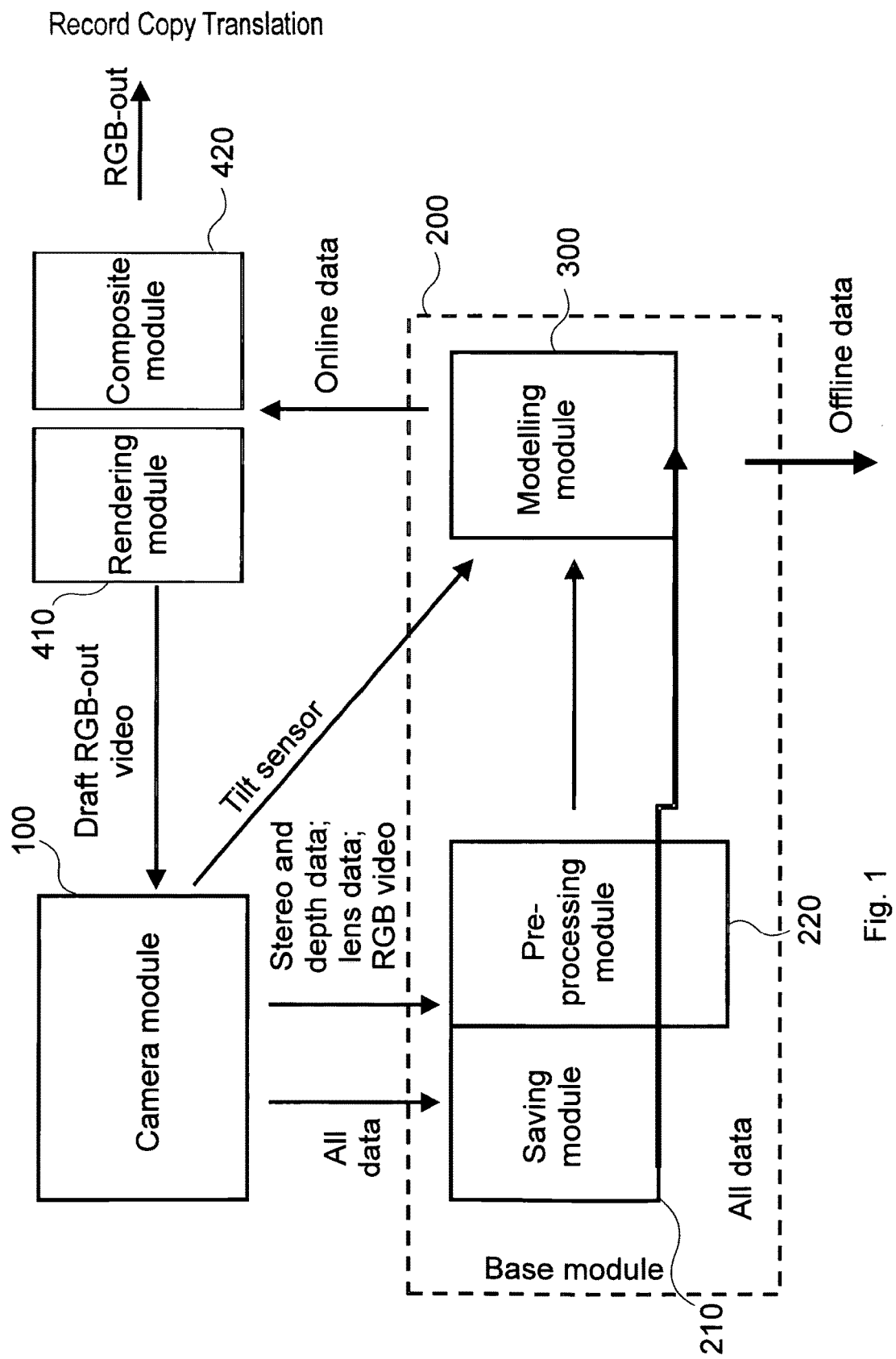
FIG. 1 is a block diagram illustrating an embodiment of the system according to the invention.

The system according to the invention serves for generating a dynamic three-dimensional model of a space, and an embodiment is illustrated in FIG. 1. The system according to the invention comprises a camera module 100 comprising an optical sensor adapted for recording image information of the space, and a depth sensor adapted for recording depth information of the space. The system according to the invention further comprises a modelling module 300 adapted for generating a dynamic three-dimensional model of the space on the basis of the image information and the depth information. In the system according to the invention, the image information with the optical sensor and the depth information with the depth sensor are recorded at a plurality of discrete times. The system according to the invention further comprises a synchronisation signal generating module determining the discrete times associated with the image information and the discrete times associated with the depth information synchronised with each other. In the system according to the invention, the dynamic three-dimensional model is generated at a plurality of discrete times of the image information and of the depth information, and at each of the discrete times the image information and depth information associated with the given discrete time are integrated into the dynamic three-dimensional model on the basis of the position and the orientation of the camera module 100 at the given discrete time, which position and orientation are determined by the modelling module 300 on the basis of the information provided by the sensors of the camera module 100 at the discrete times in an observation window. The three-dimensional model generated by the system according to the invention is called dynamic, because it builds continuously, and at each discrete time it is supplemented with new image information and depth information. Accordingly, everything is integrated into the dynamic three-dimensional model, therefore also the depth information associated with the moving objects. The voxel model already mentioned above only comprises the model of the static parts of the space.

In the system according to the invention, the first step of processing is to collect the data of the sensors (e.g. optical sensor, depth sensor) of the camera module 100, and this is carried out by the camera module 100. The camera module 100 has a data processing unit for handling sensor data, which sends the sensor signals, i.e. the measurement results, to a base module 200. The base module is a computer, which, in the embodiment of FIG. 1, runs the following software modules: saving module 210, preprocessing (or in alternatively fusion) module 220, and modelling module 300. In the present embodiment of the system according to the invention, the system comprises further a rendering module 410 and a composite module 420, which characteristically runs on a further computer; these modules can be preferably combined, i.e. a joint rendering and composite module may perform their task. The data flow and its directions between the modules are illustrated in FIG. 1.

In some embodiments, the system according to the invention provides online feedback, which may assist the operator's and the director's work. In the present embodiment, the invention comprises a display adapted for showing a preview of the dynamic three-dimensional model, and the rendering module 410 which is adapted for generating a preview from the dynamic three-dimensional model.

The measurement results preprocessed by the preprocessing module 220 are processed by the modelling module 300 in an online or offline mode, i.e. during the shooting practically in real-time or once the shooting is finished. In the case of online processing, in an embodiment of the system according to the invention, for a given discrete time of the dynamic three-dimensional model, the observation window comprises at least one discrete time preceding the given discrete time, and at least one discrete time subsequent to the given discrete time, i.e. an observation window is applied by which non-causal effects can also be taken into consideration. Therefore, the present embodiment of the invention comprises the preprocessing module 220 adapted for the preprocessing of image information and depth information.

In another embodiment of the system according to the invention, the observation window comprises at least one discrete time preceding the given discrete time for a given discrete time of the dynamic three dimensional model, i.e. in this embodiment only the causal effects are considered.

In the offline case, more complex filtering procedures are applied to achieve higher accuracy, or a broader observation window can be used in the case of the method presented above than in the online case. In case of online processing, the final transmission image to be supplied to the display is generated by the rendering module 410 and the composite module 420, on the basis of the dynamic three-dimensional model generated by the modelling module 300. In case of offline processing, i.e. in case the performing of post-production is desired, the system according to the invention prepares exports for other post-production programmes by making use of standard file formats.

The camera module comprises a preferably time-of-flight type of depth (range) sensor, which illuminates the investigated part of the space by modulated light pulses, i.e. it is an active sensor. The distance can be deducted on the basis of the phase of the returning—i.e. reflected by the objects in the space—signal. By using such a depth sensor, the measurement is only unambiguous within the modulation period (for example, the depth sensor has characteristically a 7 meter period).

Figure 2:
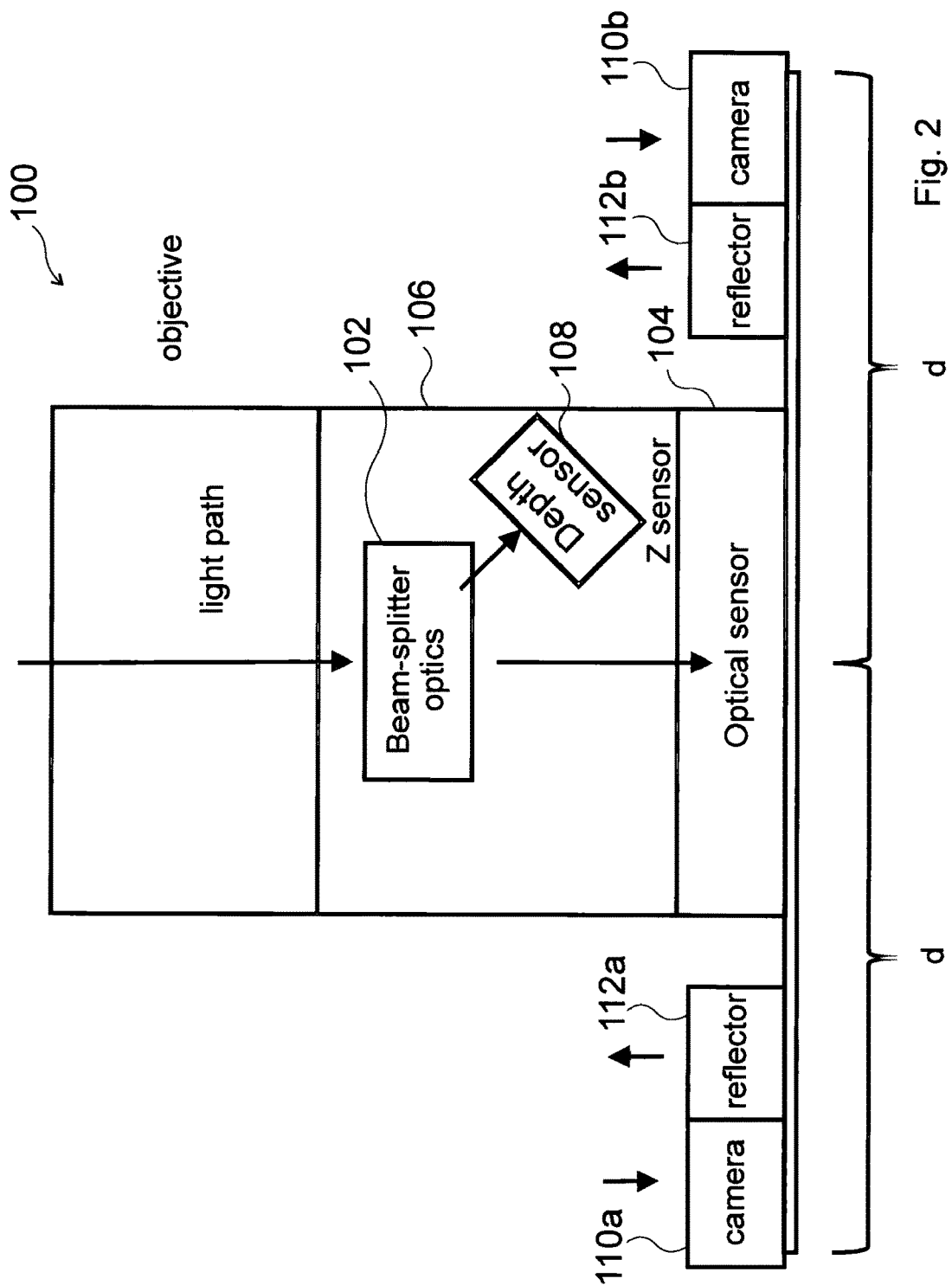
FIG. 2 is a schematic drawing illustrating in an embodiment of the system according to the invention the camera module comprising the optical sensor and also the depth sensor.

In the embodiment of the system according to the invention shown in FIG. 2, a depth sensor 108 is integrated into an optical sensor 104 that is e.g. into the optics of an RGB camera, by means of a beam-splitter optics 102. Therefore, the depth sensor 108 and the optical sensor 104 are arranged substantially along a common optical axis. The application of a common optical axis is important to make sure that the alignment conditions of the objects in the investigated part of the space are identical, i.e. that a depth measurement is carried out for those parts of the space, about which the optical sensor provides textural information. The mechanical joint of the depth sensor and the optical sensor may be provided by means of a distance ring 106 applied in the embodiment of FIG. 2 or by means of a so-called matte box 128 utilised in the embodiment of FIGS. 4A and 4B, by inserting the necessary focusing members. In a film and TV environment, matte boxes are applied under normal shooting conditions in order to screen the undesired lateral lights. Filters are frequently fitted into the compartments of matte boxes. According to the discussion above, a specially designed box may be adapted also for realising the task of optical distribution.

Figure 4:
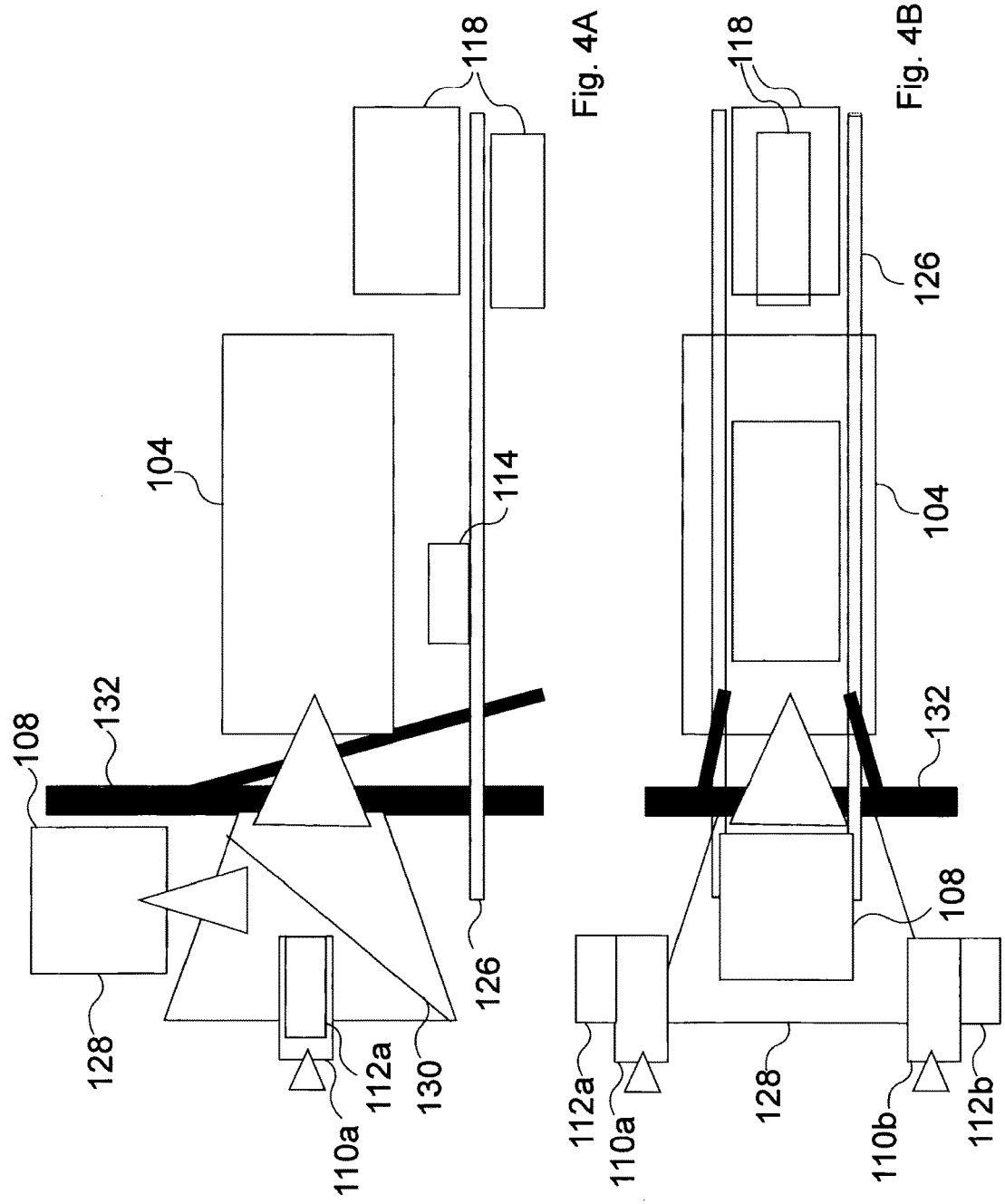
FIG. 4A is the schematic drawing of a side view illustrating the camera module in an embodiment of the system according to the invention.
FIG. 4B is a top view of the camera module of FIG. 4A.

FIGS. 4A and 4B depict the schematic drawing of the physical design of the camera module. The side view is shown in FIG. 4A. The depth sensor 108 and the optical sensor 104 are located on the two outputs of the matte box 128, and the light paths leading to them are provided by means of a splitter 130 (e.g. a partially permeable mirror). The subassemblies of the camera module 100 are fixed to a holder 132 according to FIGS. 4A and 4B. A rod 126 is also joined to the holder 132 provides, the rod 126 provides physical fixing for the camera module 100; a tilt sensor 114 and subassemblies 118 of a control electronics are connected to the rod 126. In order to ensure the appropriate operation of the tilt sensor 114, the rod 126 and the holder 132 may not move away from each other, that is they are fixed to each other. It is not necessary to synchronise the data of the tilt sensor 114 to the other data, and it may arbitrarily send data, more frequently than the optical sensor 104, the depth sensor 108 and a stereo camera 111, with the additional option of interpolating its data.

The sensitivity ranges (infra and visible light) of the depth sensor and the optical sensor are separated, and therefore such a frequency selective or spectrum selective separating optical element is preferably applied in the distance ring 106 or in the matte box 128, which does not substantially reduce the useful quantity of light received by the optical sensor i.e. by the RGB camera, and therefore a good efficiency can be achieved. Such an optical element is by way of example the so-called hot mirror separating optical element.

Figure 3:
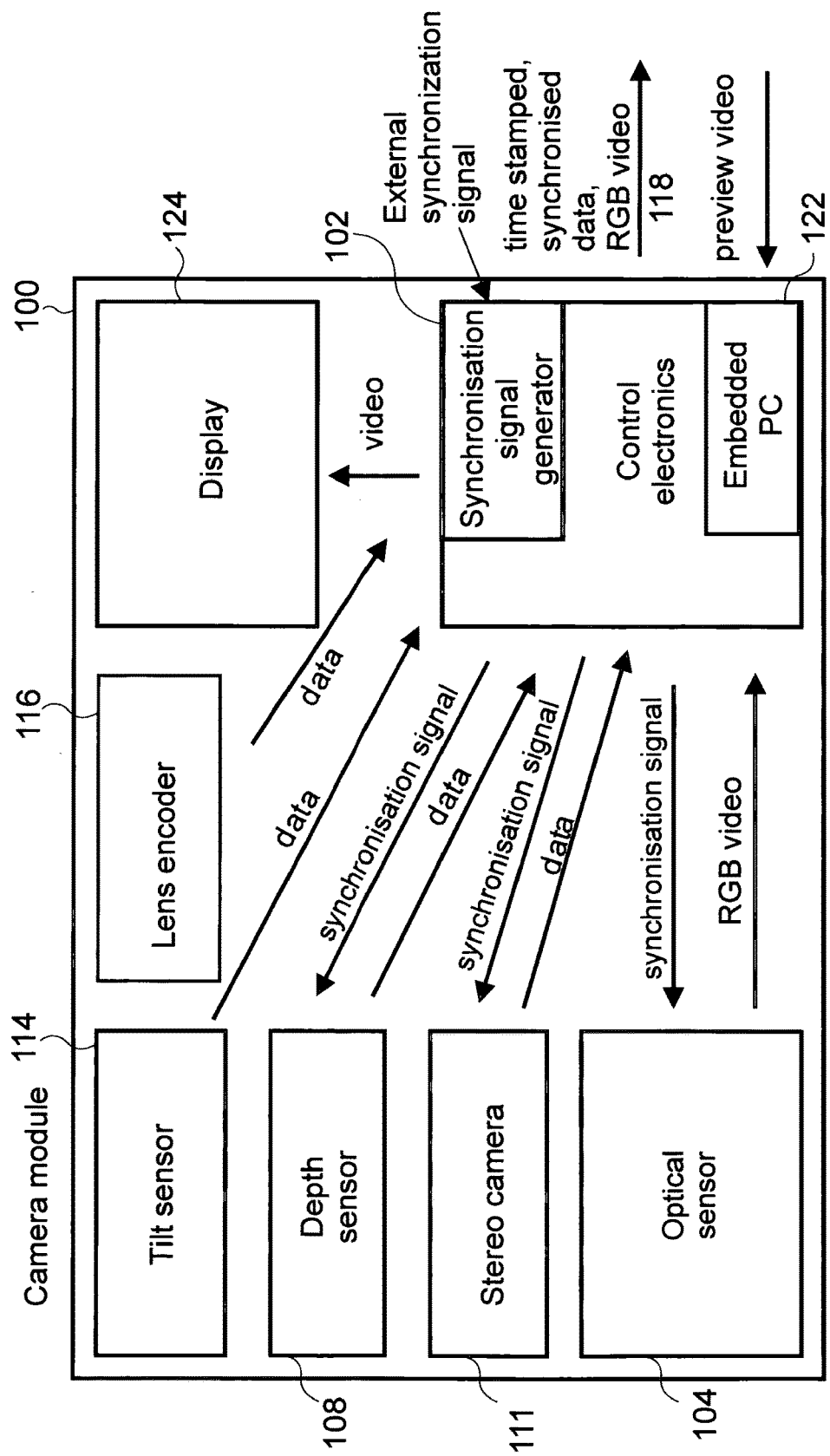
FIG. 3 is a block diagram illustrating in an embodiment of the system according to the invention the subassemblies of the camera module and the data flow between the subassemblies.

The structure of the camera module in an embodiment is illustrated by a block diagram in FIG. 3. According to FIG. 3, the camera module 100 comprises a tilt sensor 114 (inertial measurement unit, IMU) adapted for recording tilt information determining an orientation of the camera module 100, and the tilt information taken at each discrete time is also utilised for determining the position and the orientation of the camera module 100. The tilt sensor 114 consists of an integration of three types of sensors: a 3D accelerometer, a 3D gyroscope and a magnetometer. By the cooperation of these units, by employing appropriate methods, the spatial tilt and hence orientation of the apparatus to which the tilt sensor is secured, i.e. in this case those of the other subassemblies of the camera module 100, can be approximately calculated. The tilt sensor 114 provides an initial estimate for identifying the accurate 3D position and the 6D (3D coordinates, the two angles characterising the tilt and the time) trajectory of the camera module 100.

In the present embodiment of the system according to the invention, the camera module 100 comprises further sensors. The most important of these are cameras 110a and 110b (shown in FIGS. 2, 4A and 4B) with which the stereo camera 111 shown in FIG. 3 can be configured. In addition to the cameras 110a and 110b, according to FIGS. 2, 4A and 4B, reflectors 112a and 112b emitting infra-red light are arranged in this embodiment, which are the light sources of the depth sensor 108. Light of these does not pass through the beam-splitter optics 102.

Therefore, an embodiment of the invention comprises two additional optical sensors (cameras 110a and 110b) configured as a stereo camera 111, with which additional image information is recorded at discrete times synchronised with each discrete time associated with the image information and with each discrete time associated with the depth information, and a period resolution is preferably performed on the depth information on the basis of the additional image information.

Using the data provided by the tilt sensor 114 and the stereo camera 111, the period resolution of the depth sensor 108 and refining of the 6D trajectory can be achieved, as detailed later on. From the aspect of the SLAM concept, the tilt sensor is an inner sensor of the system, and the optical sensor and the depth sensor provide information about the external environment.

The camera module 100 in FIG. 3 comprises furthermore a display 124, on which the user of the system, e.g. the operator, may watch the spatial information associated with the recording just being made in real-time, i.e. preferably spatial information is shown on the display 124. During the recording, i.e. during the measurements carried out by the optical sensor 104 and the depth sensor 108, it is necessary to synchronise their data, and for this purpose the camera module 100 provides a common synchronisation signal, or in other words a trigger signal, by means of a synchronisation signal generator 120 fitted into control electronics 118. The synchronisation signal is sent to the depth sensor 108, the stereo camera 111 and the optical sensor 104, and it travels together with the sensorial data supplied by them. The synchronisation signal may also come from an external source, or the optical sensor 104, that is the synchronisation signal output of the RGB camera (shown as an external synchronisation signal in the figure) may be used for providing the same. Furthermore, the control electronics 118 perform matching or interfacing of signal levels to an embedded PC 122 forwarding the data to the base module. In order to ensure synchronised operation, the optical sensors may be triggered as depicted by FIG. 3. The tilt sensor 114 and the lens encoder 116 receive a time stamp on the embedded PC 122. The display 124 shows the image of the embedded PC 122 or the preview coming from a rendering module 410.

The base module 200 shown in FIG. 1 is characteristically a high performance server PC, which may comprise GPUs (graphical processing units) also, for the efficient running of high computing intensity algorithms in real-time. The base module 200 comprises appropriate hardware elements for receiving and transmitting incoming signals and sensorial data (e.g. gigabit ethernet, HD-SDI card), and supplying these to its software modules. The saving module 210 serves for archiving. The preprocessing module 220 receives the sensorial data and performs preprocessing: in accordance with the actual position of the optical sensor lens, it reduces distortion of the images, i.e. performs a lens distortion correction, fusing the data of the stereo camera and the depth sensor so as to perform a so-called period resolution. Furthermore, the base module 200 provides running environment for the modelling module 300.

The preprocessing module 220 or fusion module characteristically performs two types of filtering. On the one hand it filters the sensor noise prior to tracking the trajectory of camera module. On the other, on the basis of the data of the stereo camera and the depth sensor, it generates a totally filled up depth image adapted for rendering.

The efficiency of tracking the camera module is enhanced if the sensor noise is reduced in the input image by various image processing filters. A filtering is required which is characterised by 0 instead of an erroneous value in the result, so that the direction associated with the given pixel does not have to be taken into consideration.

In the course of film making, two phases may be characteristically distinguished. A static world is built up in the first phase (the camera is practically turned around to pan the space in an environment where there are no moving objects). In the second phase, during the shooting and the offline post-processing, respectively, the static world model generated already during the first phase is used (which is generally represented by a voxel model), the objects moving therein is sensed and the camera trajectory is reconstructed. Therefore, prior to the shooting, preferably a model of the static space objects can be prepared (mapping of space). The voxel model built in this process must be metrically correct and consistent. In the case of objects seen from an actual point of view, the lengths and angles must be realistic within the voxel resolution. The elements of the model not occluded from the given point of view must be consistent even in the case of a model built from a different point of view. To this end, it is required for the depth sensor to provide metrically correct values. The sensor manufacturers perform the optical and other calibration of their apparatuses to provide the best possible values. Of course, compromises must be found, and therefore the measurement is undertaken with certain accuracy even under optimal conditions. When a time-of-flight type of depth sensor is applied, the measuring accuracy largely depends on the reflection characteristics of the investigated objects. The expected accuracy is specified with +/− distance value. Sensor noise distribution, dependence on the colour of the observed objects and non-linearity characteristics are not specified.

The TOF sensor is an image sensor with optics. An approximate lens model (e.g. intrinsic matrix, radial and tangential distortion) can be applied for matching the depth image and the 3D measurements, which specify the space angle with which the values arranged in a matrix, are associated. Certain manufacturers supply their cameras with fixed optics and tuned distortion parameters, while others provide a mount for replaceable lenses.

In the course of the calibration, if the camera is on a camera manipulator (rail), the position and orientation can be determined from independent measurements. If the so projected measurements are not consistent, the primary task is to tune the parameters of camera optics.

Because of the replaceable objective, the rate of the manufacturer's calibration may deteriorate during transport, because the mechanical mounting is not entirely fixed. In the system according to the invention, local calibration may be applied (http://docs.opencv.org/doc/tutorials/calib3d/camera_calibration/camera_calibration.html), and by using the calibration rates, the measured values are continuously compensated.

For the sensor calibration, a large size test shot may be applied under studio conditions, by using objects confined by planes as well as irregular objects, with random camera motions as well as normal camera motions carried out forcibly by camera manipulator apparatuses.

We have compensated the distortions of the depth sensor available from trade to such an extent by means of appropriate filtering that a voxel model adapted for tracking the camera module was obtained. The required filtering steps are of course sensor dependent, and require pre-calibration during manufacturing.

Both spatial (when pixels are side by side) and time-related (the pixels of consecutive frames) filtering may be applied by means of the preprocessing module 220. The kernel-based spatial filters frequently applied in image processing (the pixel value is calculated by using the surrounding pixels within a given radius) have been modified in a way that they disregard the invalid (0 rate) elements, either providing better rates as an output or replacing uncertain rates with 0 rates. The applied spatial filtering operations characteristically are:

geometrical optical distortions: this is performed on the basis of the lens encoder 116 providing data about the lens and shown in FIG. 3, filtering the non-linearity of measurement by means of a calibrated lookup table, iterated erosion for the further filtering of the object boundaries, (http://en.wikipedia.org/wiki/Erosion_%28morphology %29), depth dependent rank filters: such a median filter, which does not take into consideration depth values significantly different from the central pixel, the filtering of edges: for this purpose by way of example a Sobel filter may be applied (http://en.wikipedia.org/wiki/Sobel_operator), smoothing with a Gaussian filter.

For the rendering, the depth image must be filled up in each pixel. Holefill filtering (the replacement of values believed to be faulty from the neighbouring values) is required, because the depth values believed to be faulty must be replaced with some kind of a value to make sure that a depth value is assigned to each RGB pixel value.

Time-related filtering may also be applied according to an embodiment of the system according to the invention: this is depth-dependent smoothing, which is performed as follows by the preprocessing module 220. Let I(x,y) be an average depth image in the x-y coordinate system, and D(x,y) the actual depth image, i.e. the distance of objects in each point of the x-y coordinate system above, where I(x,y) principally giving the average thereof. The initial value of the average image I(x,y) is a constant 0 image. This average image I(x,y) is weighted with the input image D(x,y) on an on-going basis. The updated value (I'(x,y)) is the output of the following filter, which may be calculated pixel by pixel:

$$I'(x,y)=\text{alpha}(x,y)I(x,y)+(1-\text{alpha}(x,y))D(x,y)$$

Alpha(x,y) is a weight function for each pixel, which can be obtained according to the following: thr(D) is a linear step function in each section between lower and upper distance values (which are typically 1 m and 7 m). When the measurements are closer, only a small error is permitted (by way of example 10 cm), and in longer distance measurements a larger value is allowed (by way of example 20 cm). The calculation method of alpha(x,y) is the following:

$$\text{beta}(x,y)=e(x,y)/thr(D(x,y))$$

$$\text{alpha}=\text{beta, if beta}=<1;\ 1\ \text{if beta}>1$$

and $e(x,y)=abs(I(x,y)-D(x,y))$

Accordingly, the value of alpha depends on the distance and on the deviation from the mean. Therefore, significantly new measuring values are introduced into image I, and the values measured within the error limit are introduced with weighting, in accordance with the depth-dependent smoothing. If an object moves into the part of the space, the first image in which it emerges overwrites the average.

The actually measured depth information may be compared with the previously measured voxel model. A matching function to be optimised can be defined, and with the optimisation thereof the position and orientation of the camera module can be specified. This function does not characteristically have a sharp maximum, and furthermore it has non-relevant local maxima, which are arranged around the physically correct position. The voxel model and the image noise influence their locations around the theoretical value. In the course of optimising, a close local minimum is selected. If the input image (image information) is perturbed with a noise smaller than the prevailing sensor noise, optimising may be shifted to another local optimum in the vicinity. Therefore, the optimisation based quasi-equipotential surface may be scanned by perturbation.

A similar variance can be experienced in the estimation of orientation and position, if the camera is physically not displaced, and only the sensor noise burdens the input image. The steps taken during preprocessing are successful only if the voxel model can be considered to be metric within the whole expected movement range of the camera, and in the case of a stationary camera, the variance of orientation and position estimate is comparable with the measuring accuracy of the camera (characteristically 1 to 2 cm, below 0.1 degree). Measuring noise is to be reduced to such an extent that it does not disturb the tracking of the camera.

According to the discussion above, the modelling module 300 preferably receives filtered sensorial data and periodicity-free depth data, and generates a dynamic three-dimensional model on this basis. The running of the modelling module 300 has two different modes practically. In offline case, it uses the already saved data, and in the online case, the actually measured and calculated values are arrived to the modelling module 300.

In an embodiment of the system according to the invention, by means of the composite module 420, the dynamic three-dimensional model is supplemented by at least one virtual object, and the preview is generated from the supplemented dynamic three-dimensional model by the rendering module 410. The modelling module 300 is linked to the rendering module 410 and the composite module 420, the task of which therefore is the CGI, i.e. the insertion of virtual objects in the three-dimensional model generated by the modelling module 300, and the textured generation of the 3D and 2D mapping of the virtual space obtained on the basis of the three-dimensional model. Because of supporting serious graphical needs, the rendering module 410 and the composite module 420 run on a separate dedicated computer.

With the rendering module 410 and the composite module 420, the purpose is usually to generate and display high quality transmission image in online mode, but a minimal functionality module (which may also be located on the base module) may run also during the recording for offline purposes, and it generates for the system user, characteristically for the operator, a support image on the display 124 according to FIG. 3. Therefore, the user may be aware of whether the given recording has been successful for the efficient implementation of the post-processing later, and in online mode this image may assist the producer's work as well. For passing on the video flows, the rendering module has an identified and standard hardware interface characterising the given studio (e.g. HD-SDI). Among the modelling module 300, the rendering module 410 and the composite module 420, a dedicated hardware channel performs short delay data transfer (this may also be practically a medium identical with the transmission picture, subject to appropriate encoding).

Figure 5:
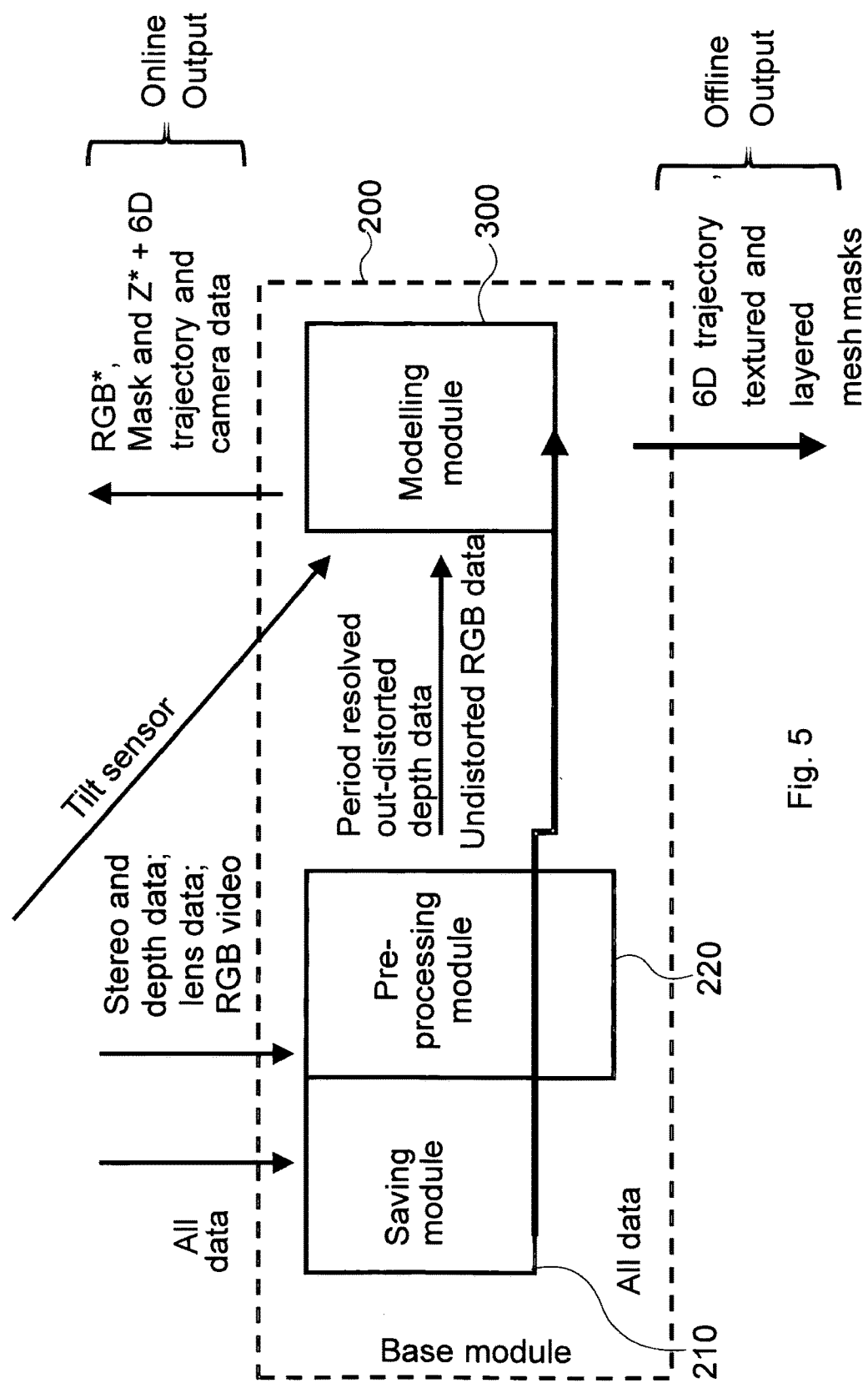
FIG. 5 is a block diagram illustrating data flow in a detail of FIG. 1.

FIG. 5 shows one detail of FIG. 1, characteristically the base module 200; the figure specifies the type of transmitted data.

Figure 6:
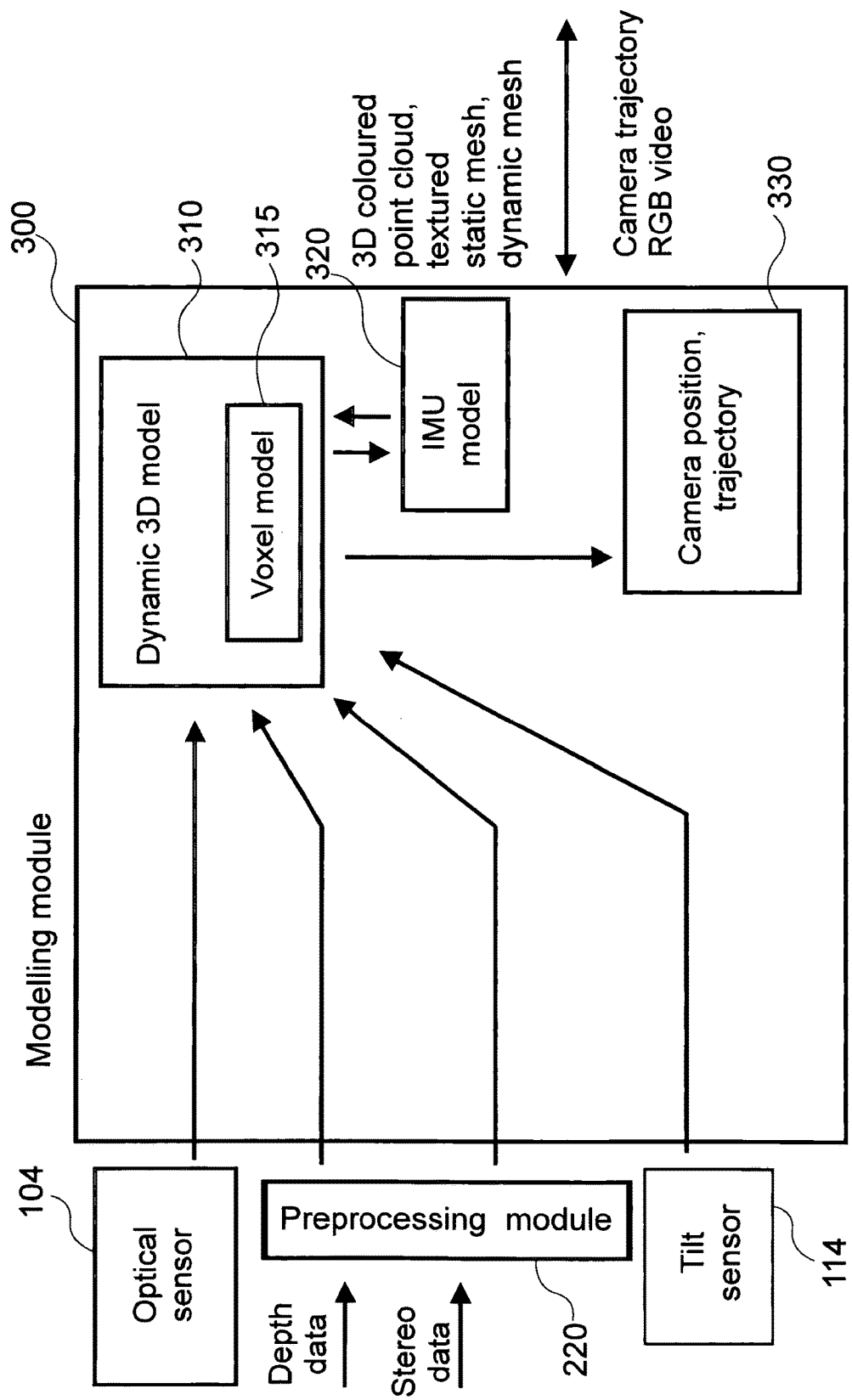
FIG. 6 is a block diagram illustrating the modelling module in an embodiment of the system according to the invention.

The block diagram of the modelling module 300 is shown in FIG. 6. By processing the data received from the measurements of the optical sensor 104, the depth sensor 108 and the stereo camera 111, the latter two fused by the preprocessing module 220, as well as the tilt sensor 114, a dynamic three-dimensional model is generated, and the newly obtained image information and depth information is integrated into the module 310. During the generation of the dynamic three-dimensional model, a texture is fitted in accordance with the measurement of the optical sensor 104 on the object models obtained from the 3D depth image supplied by the depth sensor 108, i.e. on the voxel model stored by a module 315. In the present embodiment of the modelling module 300, the camera 100 position and the trajectory of its movement, that is the above mentioned 6D trajectory are determined in a module 330. Because in the building of the dynamic three-dimensional model, the position and orientation of the camera module are used, an estimation can be given about the trajectory of camera module motion, which is made more accurate by the measurements of a module 320 supplying the data of the tilt sensor model (specifying the changes in time of the camera tilt) built on the basis of the data from the tilt sensor, and by the measurements of the stereo camera and the depth sensor.

According to the discussion above, the modelling module 300 preferably also generates a static voxel model in its own representation. This is a depth image which can be exported in the form of a point cloud and/or mesh (the surfaces of 3D objects are represented by planes) in a kind of standard file format (e.g. COLLADA). The exporting may be done for the purpose of offline application or it can be transferred to the rendering module 410 and the composite module 420. The modelling module 300 models the camera module motion, and performs the mapping of the depth information in the coordinate system of the high resolution camera. In an online case, the depth information may be transmitted as a depth image assigned to the RGB pixel rates, as demonstrated in the depth-dependent smoothing, and by way of example it can be exported in the form of a video signal or as an image sequence. The motion information may be exported into a file (COLLADA) or in the case of online use it can be packed as meta-information next to the optical sensor image Important meta-information is represented also by the camera parameters coming from the lens encoder, which parameters are also transmitted for export.

In the case of virtual studio application (a 'green/blue screen' environment), the modelling programme may be supplemented with an algorithm separating foreground and background e.g. on the basis of chroma keying. The background mask and the depth data may be packed also on a physical video channel. The static and moving objects may also be separated on the basis of the built-up 3D model. In the case of offline use, the module may also generate a so-called depth mask, and also a mesh sequence on the basis of the depth data associated with the foreground.

During the generating of the online transmission image shown by the display 124, a dynamic three-dimensional model generated from the real data of the space is used, and this model is determined by the data of the sensors in accordance with the actual camera position. On the other hand, virtual objects, e.g. computer generated model objects, model background, textures, manipulations/animations can be built into the online transmission image, or integrated into the dynamic three-dimensional model. The advantages of this approach will be presented in details below. For generating the online transmission image, the position of the virtual camera associated with the virtual objects must be matched to the real position of the camera module, but only their alignment is a requirement, and therefore their physical positions may be different. The calculation of the image obtained on the basis of the dynamic three-dimensional model is carried out by the rendering unit. The data obtained with the rendering unit defines the 2D image which can be shown on the display 124, and to this, on the basis of the virtual model, further eventually prepared CGI elements and animations can be added by means of the connected composite module. Because the various layers of the voxel model and the virtual model may occlude each other and may cast a shadow, it is necessary to combine the rendering and composite activities into a joint module, that is the rendering and composite module. The finally assembled material provides an RGB picture which can be shown on the display.

Because the system builds the model of the recording space, under certain limits the track (Rc) of the camera providing the virtual transmission image may be different from the physical reality (Rc). Information from all possible views is available about the fixed elements of the space, if the mapping of the space has been carried out prudently with this object in mind. In the space model so established, comprising only the fixed elements (static model), a virtual camera can be installed anywhere, because an arbitrary view may be obtained from the world model. If there are actors or other moving components in the recording, the modification of the camera track is a more problematic task, because a full picture of the actor in motion is only available from the point of view of the camera. If the camera is displaced from the point of view, a lack of information arises. If the virtual camera is moved along the axis of the real camera, i.e. it is taken further, the lack of information does not occur. Therefore, the virtual camera can be removed from or taken into a scene along the axis of the camera. When the camera is sufficiently far from the actors so that the lack of information is no longer remarkable, again full freedom can be enjoyed in moving the camera. Therefore, huge virtual spaces can be covered by combining the virtual and real camera tracks.

Figure 7:
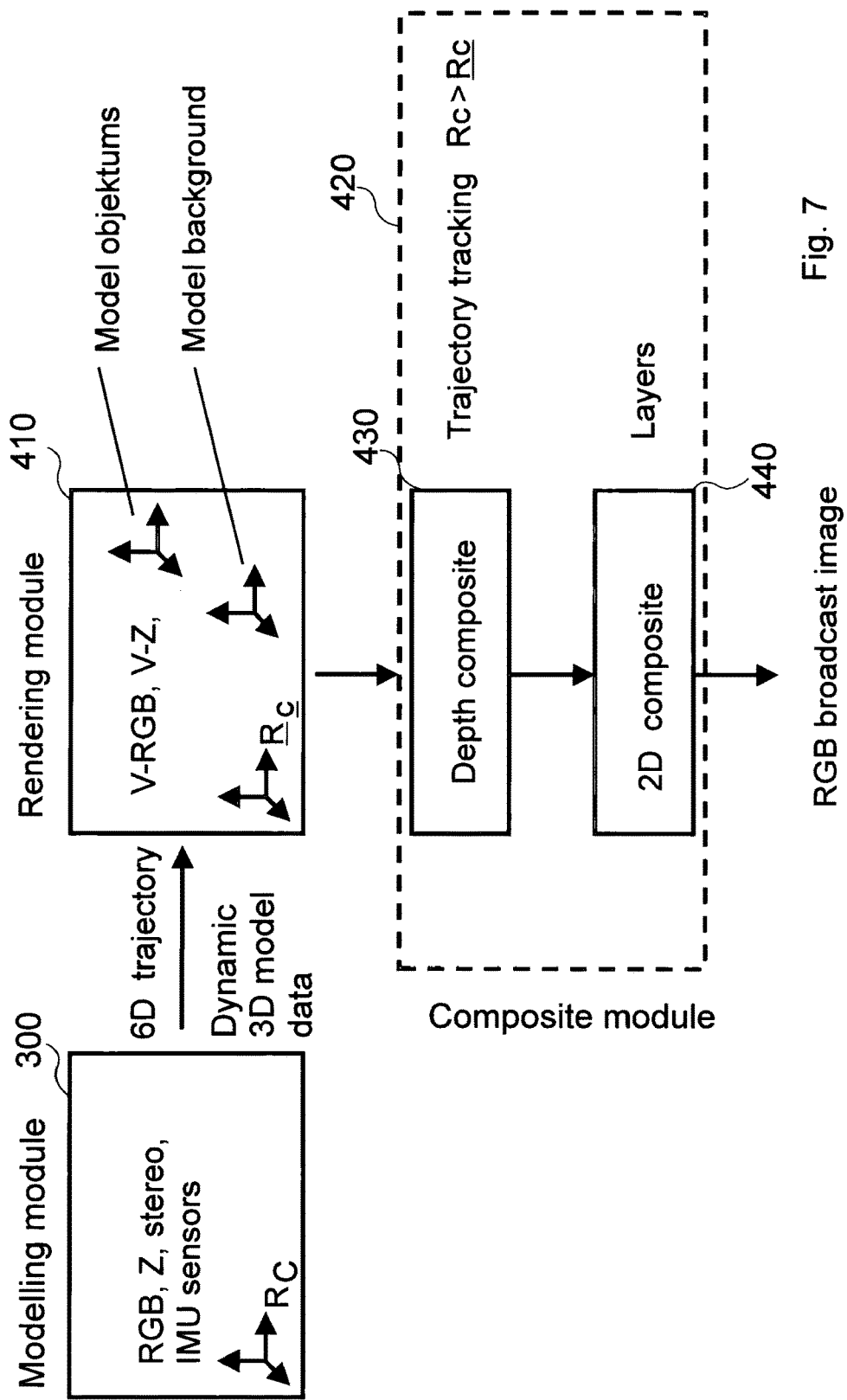
FIG. 7 is a block diagram illustrating the modelling module and the rendering and composite module in an embodiment of the system according to the invention.

In addition to the discussion above, FIG. 7 illustrates that the rendering module 410 receives the trajectory of the camera and the image information and depth information associated with the actual status of the dynamic three-dimensional model from the modelling module 300. The depth information may be characteristically broken down into foreground model objects and model background, and in the rendering module 410, virtual objects may also be integrated into the coordinate system Rc of the virtual camera on the basis of the incoming data and furthermore on the basis of virtual objects and virtual background. After rendering, the data are supplied to the composite module 420, where depth compositing is carried out in a module 430, i.e. the Rc coordinate system of the real objects is matched to the Rc coordinate system of the virtual objects. Next, 2D compositing (e.g. with a subtitle or logo) takes place in a module 440, the 2D layers are matched, and therefore the coloured transmission image is generated.

In the course of building the world model, i.e. the static model of the space, preferably voxel representation is used. In the case of each measurement, in view of the previous information (estimating the camera position and knowing the direction of projection), the voxel model is modified. In the course of building the voxel model, four large steps are distinguished, which basically follow the method of the paper by S. Izadi et al., 'KinectFusion: Real-time 3D Reconstruction and Interaction Using a Moving Depth Camera', in the *Proceedings of the 24th annual ACM symposium on User Interface Software and Technology*, pp. 559-568, 2011 (hereinafter the Kinect document):
(1) turning the depth image containing the depth data into a 3D voxel representation,
(2) determining the camera position by means of the ICP (iterative closest point) algorithm. ICP is a 2D-2D registration, where the depth image is registered from the voxel model to the 2D image obtained by projection from a position corresponding to the camera position,
(3) updating of the voxel model, this consists of spatial integration of the measured data. In the course of this process, the normal of the surfaces are considered, and the value of new measurement is regarded subject to the angle included by the normal located at the intersection of the straight line from the point of view and the surface,
(4) generating a depth image from the given point of view on the basis of the data of the voxel model. The result of this step is necessary for the ICP iterative process.

The procedure according to the Kinect document will only work appropriately in a small part of the space (characteristically 3 m×3 m), and we suggest two solutions for the extension thereof. One of these is the use of spatial Octree (http://en.wikipedia.org/wiki/Octree) compression, by which it is feasible that the resolution of the voxel-based representation is not uniform, but changes to the required extent. Hence, those regions of space which do not comprise a 'surface' have a much coarser resolution than the surface parts. This approach is very efficient from the aspect of data storage, but efficiently organising the data access of a parallel GPU algorithm is very difficult and demands highly sophisticated solutions. The other approach is the handling of several overlapped 3 m×3 m regions of space, efficiently by two video cards, where one card works with one part of the actual voxel model, while the other keeps ready the expected voxel model part required soonest during the processing and continues the calculation as required.

In the case of the Kinect document based solution, hiding is a problem. The document describes a Kinect sensor system, which comprises several sensors (camera, depth sensor) placed side by side. Accordingly, the sensors do not see the world from the same point of view, therefore there will be such regions which are seen by one sensor, but not seen by the other. Objects may shade regions detected by the other sensor. The system according to the invention offers a solution, because in this system the depth sensor and the stereo camera are optically located along the same axis as the optical sensor, because the latter is symmetrically arranged around the optical sensor.

It is a characteristic error of virtual studio systems that the virtual objects may be shaking in comparison with real objects. This is primarily the consequence of improper tracking accuracy. In the case of a purely Kinect document based solution, this is a consequence of the fact that determining the camera module position is limited by the size of the voxels in the virtual space. To eliminate the vibration, in addition to appropriate filtering, the RGB images made by the optical sensors and the tilt sensor data must be taken into account to determine a more accurate position, and to make an appropriate decision for eliminating the vibration. Our vibration compensating method does not use the direct so-called early fusion of the measured sensor data, but the data are taken into consideration in the course of higher level processing. Practically, a decision is made on the basis of voting. An example of this situation decision is the following: if it is known that the camera stands and that the virtual objects are not in motion, then on the basis of the RGB image obtained by the optical sensor it can be determined satisfactorily where the vibration will not emerge. If the camera moves, the method is the following: By stopping the image to be updated, the extent of acceleration is investigated on the basis of the tilt sensor, and the image to be updated is compared with the actual measurements of the optical sensor and the tilt sensor. In view of the difference of RGB images and the data of the tilt sensor, a filtering is carried out: a situation decision is made about whether the camera is on the move or not, and whether on this basis a vibration is permitted or not. Any eventual vibration can be eliminated on this basis.

Camera tracking uses a two-step iterative method. First loop: on the basis of the voxel block, from a point of view corresponding to the previous position, a depth image is generated by the Raycasting algorithm based on the Kinect document. Compared to this, the displacement is calculated iteratively on the basis of the actual first period depth image. The result thereof is made more accurate in the second loop by the measurements of the other sensors, on the basis of knowing the steady result measuring range of each sensor, and rather considering those sensors, which proved to be the best in operation in the given situation. The feature-based data, the previous RGB image, the previous position, and during the mapping of the space the content of the voxel block and the artificial depth image, respectively, are updated frame by frame.

In the modelling apparatus of the system according to the invention, for integrating the image information and depth information associated with the given discrete time into the dynamic three-dimensional model of the space, the position and the orientation of the camera module taken at the given discrete time must be known. To determine this, in an embodiment of the system according to the invention, a probability estimation is applied, the functioning of which will be described below. The described probability estimation is not based on Kalman-filter applied in prior art solutions, but it is based on a Maximum Likelihood (ML) estimation. In a predetermined length of observation window, the ML estimation considers the measuring data associated with an earlier and/or later discrete time coming from the camera module sensors (image information, depth information, eventually tilt information and additional image information) as detailed below. If during the ML estimation, a subsequent state is also taken into consideration, the estimation about the actual state of the camera module may only be given with a delay. The functioning of the probability estimation can be summarised so that in a first step it receives from the camera module the measurement results of the camera module sensors, it performs an estimation on this basis and determines the most probable state in view of the actual state of the camera module, on the basis of the measurement results available from the observation window of determined length and the probability model.

Therefore, in the present embodiment, the position and orientation of the camera module 100 taken at the given discrete time is determined on a probability basis in accordance with the information from the sensors of the camera module 100, especially by means of the Maximum Likelihood method.

The state vector describing the position and orientation of the camera module is marked by x, and the vector of the measurement results by y. The dynamic three-dimensional model and the camera module motion are interpreted in discrete time, at the synchronised discrete times as discussed above. The change in the state vector is described by the following equations:

$$x_{n+1} = f(x_n) + v_n$$

$$y_n = g(x_n) + \mu_n$$

where the running index n marks the discrete times and $v_n$ and $\mu_n$ are noises, the distribution of which are specified as a Gaussian noise as a first approach, using their covariance matrix, and the covariance matrix Q is associated with the noise v and the covariance matrix R is associated with the noise μ. These noises simultaneously model the inner noise of the system and other accidental impacts as well.

The function f(.) is the function of the state vector transition, which stems from the discretisation of the following (trivial) system of equations:

p:=position
v:=velocity
a:=acceleration
ω:=direction (space angle)
$\dot{\omega}$:=angular velocity
$\ddot{\omega}$:=angular acceleration
$v=\dot{p}$
$a=\dot{v}$ The space angles are preferably modelled on quaternion algebra, because this shows the smoothest behaviour in view of the filters, and therefore the space angles are stored as 4-unit length vectors. The space angles so appearing only represent a real angle (or its time derivatives), if the quaternion vectors are normalised, and therefore three restrictions emerge:

$\|\omega\| = 1$
$\|\dot{\omega}\| = 1$
$\|\ddot{\omega}\| = 1$

Hence, the variants are arranged in a common state vector which describes the position and the orientation:

$x_1 := p_1$
$x_2 := p_2$
$x_3 := p_3$
$x_4 := v_1$
$x_5 := v_2$
$x_3 := v_3$
$x_7 := a_1$
$x_8 := a_2$
$x_9 := a_3$
$x_{10} := \omega_1$
$x_{11} := \omega_2$
$x_{12} := \omega_3$
$x_{13} := \omega_4$
$x_{14} := \dot{\omega}_1$
$x_{15} := \dot{\omega}_2$
$x_{16} := \dot{\omega}_3$
$x_{17} := \dot{\omega}_4$
$x_{18} := \ddot{\omega}_1$
$x_{19} := \ddot{\omega}_2$
$x_{20} := \ddot{\omega}_3$
$x_{21} := \ddot{\omega}_4$ On this basis, the components of the discretised state transition function (f(.)) can be expressed:

$f(x)_1 := x_1 + h \cdot x_4$
$f(x)_2 := x_2 + h \cdot x_5$
$f(x)_3 := x_3 + h \cdot x_6$
$f(x)_4 := x_4 + h \cdot x_7$
$f(x)_5 := x_5 + h \cdot x_8$
$f(x)_6 := x_6 + h \cdot x_9$
$f(x)_7 := x_7$
$f(x)_8 := x_8$
$f(x)_9 := x_9$
$f(x)_{10} := (a \times b)_1$
$f(x)_{11} := (a \times b)_2$
$f(x)_{12} := (a \times b)_3$
$f(x)_{13} := (a \times b)_4$
$f(x)_{14} := (b \times c)_1$
$f(x)_{15} := (b \times c)_2$
$f(x)_{16} := (b \times c)_3$
$f(x)_{17} := (b \times c)_4$
$f(x)_{18} := c_1$
$f(x)_{19} := c_2$
$f(x)_{20} := c_3$
$f(x)_{21} := c_4$ Where h is the time scale. And, (a×b) is the Hamilton-product of the quaternion vectors a and b. In the formulae, the components of the quaternion vectors are the following:

$$a_1 := \frac{x_{10}}{\sqrt{x_{10}^2 + x_{11}^2 + x_{12}^2 + x_{13}^2}}$$

$$a_2 := \frac{x_{11}}{\sqrt{x_{10}^2 + x_{11}^2 + x_{12}^2 + x_{13}^2}}$$

$$a_3 := \frac{x_{12}}{\sqrt{x_{10}^2 + x_{11}^2 + x_{12}^2 + x_{13}^2}}$$

$$a_4 := \frac{x_{13}}{\sqrt{x_{10}^2 + x_{11}^2 + x_{12}^2 + x_{13}^2}} \text{ and}$$

$$b_1 := \frac{x_{14}}{\sqrt{x_{14}^2 + x_{15}^2 + x_{16}^2 + x_{17}^2}}$$

$$b_2 := \frac{x_{15}}{\sqrt{x_{14}^2 + x_{15}^2 + x_{16}^2 + x_{17}^2}}$$

$$b_3 := \frac{x_{16}}{\sqrt{x_{14}^2 + x_{15}^2 + x_{16}^2 + x_{17}^2}}$$

$$b_4 := \frac{x_{17}}{\sqrt{x_{14}^2 + x_{15}^2 + x_{16}^2 + x_{17}^2}} \text{ and}$$

$$c_1 := \frac{x_{18}}{\sqrt{x_{18}^2 + x_{19}^2 + x_{20}^2 + x_{21}^2}}$$

$$c_2 := \frac{x_{19}}{\sqrt{x_{18}^2 + x_{19}^2 + x_{20}^2 + x_{21}^2}}$$

$$c_3 := \frac{x_{20}}{\sqrt{x_{18}^2 + x_{19}^2 + x_{20}^2 + x_{21}^2}} \text{ and}$$

$$c_4 = \frac{x_{21}}{\sqrt{x_{18}^2 + x_{19}^2 + x_{20}^2 + x_{21}^2}}$$

Function g(.) mapping the state vector to the measurement results is specified by the following formulae:

$g(X)_1 := x_1$
$g(X)_2 := x_2$
$g(X)_3 := x_3$
$g(X)_4 := x_{10}$
$g(X)_5 := x_{11}$
$g(X)_6 := x_{12}$
$g(X)_7 := x_{13}$

In the probability model aimed at determining the state vector, the filter calculates with the negative logarithm of probability and its scale factor-free version due to the following factors. The best convergence is given by the Gaussian type of distribution functions, because they are smooth everywhere and their derivate is only zero at the extremum. The probability density function of a multidimensional general normal (Gaussian) distribution (for zero expected value) is as follows:

$$f_x(x_1, \ldots, x_k) = \frac{1}{(2\pi)^{k/2}|\Sigma|^{1/2}} \exp\left(-\frac{1}{2} x^T \Sigma^{-1} x\right)$$

where $\Sigma$ represents the variance matrix. The logarithm thereof is the following:

$$\log_e(f_x(x_1, \ldots, x_k)) = \log_e\left(\frac{1}{(2\pi)^{k/2}|\Sigma|^{1/2}}\right) - \frac{1}{2} x^T \Sigma^{-1} x$$

Since we are looking for the maximum of probability and the logarithm function is a monotonous function, for finding the most probable value, the logarithm of the probability density function can be used, and the constant factor being irrelevant from the aspect of the location of the maximum may be omitted from the function for the purpose of calculation. It is very important to carry out the calculation with the logarithm of probability density function, because otherwise even an accuracy of double would not be sufficient for the calculation, and furthermore in this way the product of various events turns into a sum in the probability model, which further improves the accuracy of the calculation.

To use minimising algorithm for finding the most probable value, a sign exchange is also to be applied, and thereby the maximum location of the function is changed into a minimum location. Therefore, the final probability density function applied in the calculations is the following for a single probability variant:

$Pdensity(x) = x^T \Sigma^{-1} x$ in the formula, the covariance matrix describing the noise in our model may replace the variance matrix $\Sigma$.

From the measurement results of the camera module sensors, an m wide observation window is available (which may eventually be called history). On the basis of the model above, the following probability density function can be established for the state vector:

$$\sum_{i=n-m}^{n} ((f(x_{i-1}) - x_i)^T Q(f(x_{i-1}) - x_i) + (y_i - g(x_i))^T R(y_i - g(x_i)))$$

where n is the sequence number of the final investigated discrete time and n-m is that of the first investigated discrete time. The m wide window may cover discrete times preceding the investigated discrete time, and in this case the state vector x is obtained by considering the causal effects, when the sequence number of the actually investigated discrete time is n.

The m wide window, however, may also cover discrete times after the investigated discrete time, and then after the investigated discrete time the measurement results of some more discrete times are 'waited for' so that they play a role in determining the state vector. This causes a delay in building up and presenting the dynamic three-dimensional model, but it greatly increases the accuracy of the state vector. By optimising the delay and the improvement of accuracy, the value of m can be determined, which is 21 in a preferred embodiment in such a way that by the investigated discrete time, 10 earlier and 10 subsequent discrete times are taken into consideration. If the m wide window covers discrete times after the investigated discrete time as well, non-causal effects are also taken into consideration. The investigated discrete time may be located elsewhere in this time window, not only in the middle.

For minimising the probability density function above, e.g. the BFGS algorithm (http://en.wikipedia.org/wiki/BFGS, Broyden-Fletcher-Goldfarb-Shanno algorithm) is applied. According to the invention, the BFGS algorithm is used so that the Hess-matrix found in the previous run by the algorithm is re-utilised, and therefore the convergence rate increases further.

A proper initial value is to be assigned to the state to be recalculated; otherwise the minimising will not be convergent. This can be resolved by a conventional Kalman filter, which provides a delay-free estimation, making use of the numerically locally linearized version of the above mentioned discretised model.

It is a problem of TOF sensors based on phase measurement that they see up to a given distance, and then yields a periodically identical result. Practically, this means that if the period of measuring modulation is 7 m, then in the case of an object located at a distance of 5 m, 12 m and 19 m, the same measurement results will be obtained. This is the so-called period problem. The elimination thereof may be carried out in several ways. On the one hand, by using a stereo camera, the periods can be distinguished, because the stereo camera also senses the distance, and although its depth resolution is not as good as that of a depth sensor, it is able to distinguish the differences of period ranges unambiguously. This is preferably applied also in some embodiments of the invention. Another solution could be the introduction of multi-frequency depth measurement. In this case a frequency changed by quick switching is applied for the measurement (there is no measurement during the switchover time) and the periods can be determined on the basis of the differences. A third possible solution is the model-based method, when the a priori data and information obtained during the initial mapping of the space are used for eliminating the period problem. In this case the initial mapping of the space is characteristically made statically, by the so-called 'circular panning' and 'circular dolly shot' method. On the basis of the mapping of the space, a three-dimensional model is generated, in which on the basis of continuity and the model data, the position of camera module can be unambiguously specified, and thereby the period problem may also be solved. During the initial mapping of the space, in designing the 3D model, heuristic assumptions may be made, which basically take into consideration the locations of the planes. This latter solution requires user intervention during the building of the model, in order to resolve the uncertainties.

The magnetometer of the tilt sensor may be deteriorated significantly by the environmental effects (e.g. a large size ferromagnetic object in the scenery, high power electric devices). If the magnetometer functions appropriately in the tilt sensor, the angle estimation can be performed with appropriate accuracy from the data of the tilt sensor, because the signal to noise ratio is satisfactory. This is done on the basis of a known algorithm; the data of the three sensors in the tilt sensor are fused on quaternion algebra by making use of a Kalman-filter: in accordance with the accelerometer and the magnetometer an absolute angle is calculated, the gyroscope gives the derivate of the angle. The acceleration can be calculated if the angle is known. Therefore, the output will be the real acceleration and the angle value. If the signal to noise ratio is inappropriate, the task is much more difficult, because only the data of the gyroscope and the accelerometer can be used. In this case it is worth improving the signal to noise ratio.

The results provided by the optical sensor and the modelling module are post-processed in the composite module 420, the required communication is catered for by a standard interface. The composite module 420 receives the image information, the depth information, the virtual data (CGI-RGB and CGI depth data) as well as the textured mesh and the camera module trajectory. The composite module is able to carry out a number of post-processing methods magnitudes faster, if a dynamic three-dimensional model generated by the modelling module and synchronised to the video made by the optical sensor is available. In known solutions, in the composite software, the expert performing the post-processing must build the 3D object models, which is assisted by the currently available programs, but the semi-automatic analysis of data is very slow by this method, generally requiring the finding of image characteristics—so-called features—(and so-called pseudo-characteristics or pseudo-features may also appear), which demands much more time than the time of the recorded material depending on size and on the difficulty of processing task, and furthermore it yields an inaccurate and loose point cloud, which does not substitute the building of the dynamic three-dimensional model, but only reduces the extent of subsequent human intervention. On the contrary, the system according to the invention provides a dense and accurate cloud directly, and therefore the disturbing presence of pseudo-features can not come up.

In case of studio recordings, handling of undesired cases eventually appearing during the procedures may be facilitated, if artificial three-dimensional objects are placed in the green screen environment in the investigated part of the space. This can only play a role in the embodiments comprising a stereo camera as well. Three-dimensional objects of a colour identical with that of the background may be placed, preferably e.g. cubes located in the space on racks, with said cubes having two-dimensional signs or legends using an easy to occlude, but different green colour. The depth sensor sees these in space, and therefore these fixed objects may make more accurate and facilitate the building of the dynamic three-dimensional model. The stereo camera senses the two-dimensional signs, and it can make use of them as well-identifiable signs that can be seen by both optical sensors of the stereo camera, for the period resolution or for the synchronising of image information and depth information, or even for vibration compensation.

Figure 8:
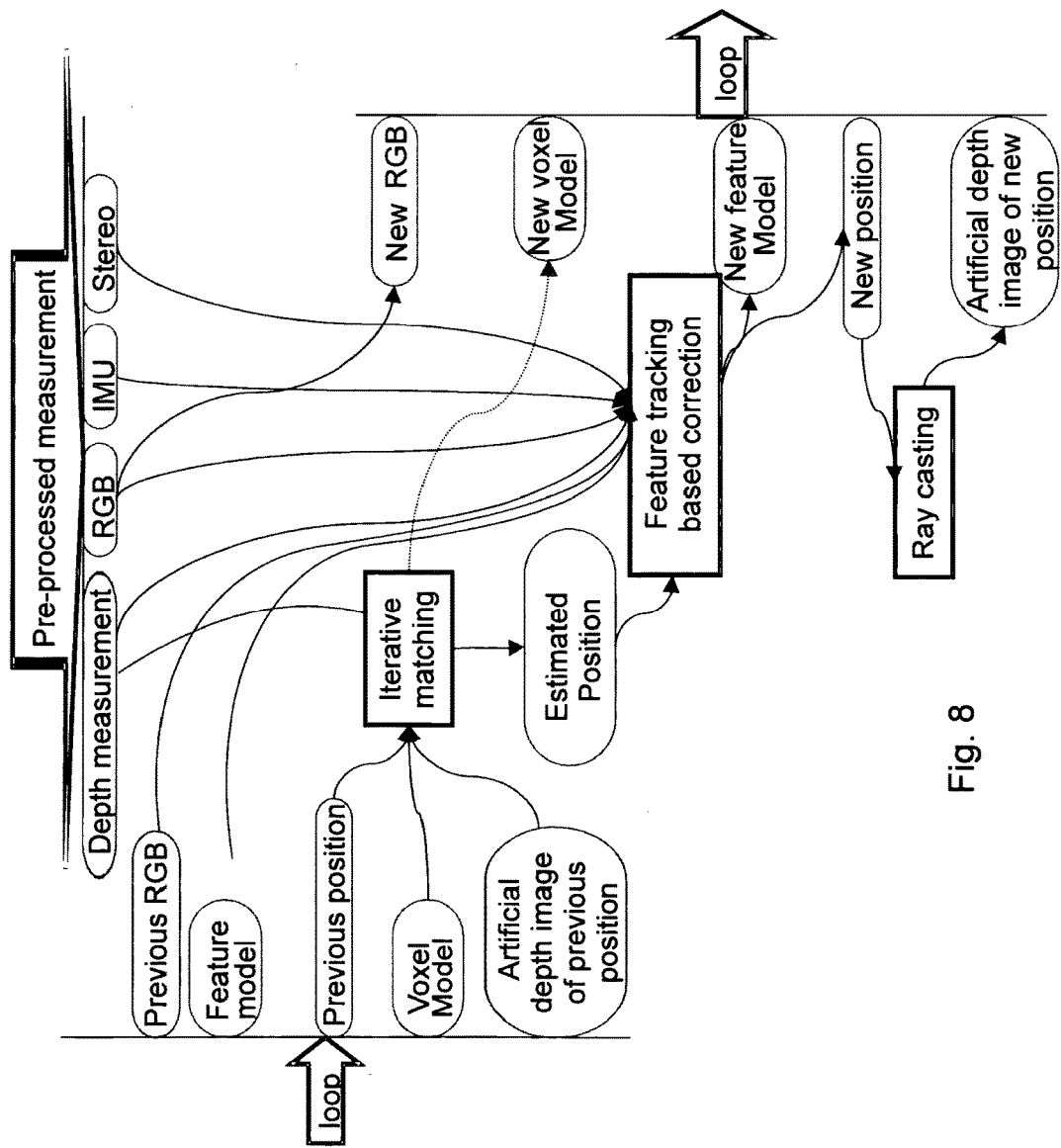
FIG. 8 is a block diagram showing a detail of an embodiment of the method according to the invention.

FIG. 8 illustrates the operation of an embodiment of the system according to the invention. The figure shows two input sides and one output side. The lateral input side features the data resulting from the feedback, i.e. the image information associated with the previous time (Previous RGB), the set of well-identifiable and available characteristics (Feature model), previous position of the camera module (Previous position), the static world model (Voxel model) and the depth image of the earlier status (Depth image of previous position). The other input shows the depth information from the measurement by the depth sensor (Depth data), image information from the optical sensor (RGB), the tilt information from the tilt sensor (IMU) and data from the stereo camera (Stereo).

In the embodiment illustrated in FIG. 8, iterative matching (Iterative matching) is applied, to obtain an estimated position and orientation (Estimated position) of the camera module, and to generate the voxel model of the next discrete time (New voxel model). The image information obtained from the measurement specifies (RGB) the image information (New RGB) to be used at the next discrete time.

For iterative matching, the solution described in the Kinect document is used, the version implemented in the PointCloudLibrary (www.pointclouds.org) is used. According to the figure, the depth image pre-filtered by the pre-processing module is transferred to this algorithm A secondary result of the known algorithm is a foreground mask, which separates the foreground objects.

In the embodiment of FIG. 8, the estimation of the camera position and orientation is made more accurate by applying the probability estimate described above, with an appropriately selected observation window. The primary input of the responsible module is given by the roughly estimated position, and furthermore it also receives the measurement data, the image information of the previous discrete time and the set of well-tracked features. As an output, the updated model of the features (New feature model), and the new position and orientation of the camera module (New position) are obtained.

The feature tracking based correction is carried out as follows. The RGB image which is characteristically masked by a foreground mask is compared with the previous one. If the difference is not significant and on the basis of the distribution, it can be interpreted as a sensor noise, i.e. the camera module is presumably not displaced, the last estimated position and orientation are the outputs. If the difference is qualified to be significant, then a so-called feature detection is carried out on the previous RGB image, i.e. well-tracked features are sought, preferably on the background elements only, and the 2D displacement of such feature points found in the previous image is investigated. On the basis of the depth information, a point cloud is made from the points, which is compared with the point cloud of the previous iteration and the transformation associated with the displacement of the camera module and with the changing of its orientation is calculated. If, on the basis of the tilt information, the position estimated from the ML estimation is not acceptable, then the displacement obtained on the basis of feature tracking is accepted.

In a further embodiment, the transformation calculated by using the feature points can be combined with the result of the ML estimation, e.g. the weighted average. In a further embodiment, the model of feature points may supplement that of the input set of the ML estimation.

According to FIG. 8, the RayCasting algorithm of the Kinect document is used in the present embodiment, and by means of the algorithm, the artificial depth map associated with the refined position and orientation is prepared.

Some embodiments of the invention relates to a method for generating a dynamic three-dimensional model of a space. In the course of the method according to the invention, image information of the space is recorded by means of an optical sensor of a camera module, and depth information of the space is recorded by means of a depth sensor of the camera module, and a dynamic three-dimensional model of the space is generated by means of a modelling module on the basis of the image information and the depth information, the image information is recorded with the optical sensor and the depth information is recorded with the depth sensor at a plurality of discrete times, and the discrete times associated with the image information and the discrete times associated with the depth information are determined synchronised with each other on the basis of a synchronisation signal, and the dynamic three-dimensional model is generated at a plurality of discrete times of the image information and of the depth information, and at each discrete time the image information and the depth information associated with the given discrete time is integrated into the dynamic three-dimensional model on the basis of the position and the orientation taken by the camera module at a given discrete time, which are determined by the modelling module on the basis of information provided by the sensors of the camera module at the discrete times in an observation window.

By means of the system according to the invention, the following data may be made accessible to the user, even substantially in real-time, in which the delay applied according to the filter presented above may be included. With the system according to the invention, in the generated three-dimensional model of the space, the following are available:
 a model of static parts of the space,
 a model of the dynamic that is moving parts of the space, which said model is synchronised frame by frame with the RGB image of the optical sensor,
 the current position of the camera module collecting information, i.e. making a recording of the space with its sensors, and in the case of a moving camera its position changing frame by frame i.e. its track and orientation, since these data are required for the appropriate generation of the dynamic three-dimensional model, and
 the image information of the optical sensor.

These data may be used in a number of various areas, and by means of applying these data, special effects can be implemented which could not be made earlier or only with a lot of difficulty and at a much higher cost. Several examples of this will be listed below.

The models above and other data obtained by means of the system may be used for tracking the motion, i.e. for the so-called match moving. Camera tracking, that is knowing the current spatial position of the recording camera module (or hereinafter shortly the camera) may be used as follows.

Knowing the current position of the camera enables the insertion of any computer generated 3D content into the recorded image. If the inserted model has been put in place in one frame of the recording, i.e. the recording space has been matched to the computer generated space, its stays in its place without any further intervention regardless of the camera motion, since by being aware of the current position of the camera, the computer can calculate for each frame from a view corresponding to the camera position the image of the inserted element (from the dynamic three-dimensional model principally an arbitrary view can be extracted). One field of application is when an actor is shot in front of a homogeneous colour background, which is characteristically blue or green (so-called green/blue screen) and then the background colour is removed from the image to be replaced by a computer generated background. Therefore, the actors moving in front of the camera may be placed in an arbitrary environment once the motion data of the camera are known, in other words they can be 'surrounded' by any environment. This is used, for example, by the virtual reality television studios to be discussed later.

If the image is recorded in a real environment and it is not intended to replace the background, animated or fixed models may be inserted into the recorded background and the undesired parts of the recorded image may be deleted or covered so that they must only be defined in and removed from one frame of the recording. Hence, for separating the desired elements of the space, it is not necessary to animate the mask (rotoscopy) or to track their motion in the RGB image by means of various image processing (feature tracking) techniques. The thereby almost automatically generated masks may be used in several areas of post-production, for example when color grading the shots or when retouching the details intended to be removed later on from the image. Particle systems simulated in space may also be automatically inserted in the same way, like smoke, fog, rain, snow, or liquid simulation. The simulated particles may interact with the elements of the recorded space, a room may be flooded with simulated water in a way that the waves of the water surface break on the elements of the recorded space, or the smoke does not penetrate the walls of the recorded space.

The use of real camera motion in computer generated animation. A camera motion recorded in an arbitrary space, for example the motion of a hand-held camera may be transferred to a 3D animation programme, and therefore absolutely realistic camera movements can be used in 3D animations without an animator having to build or edit the camera trajectory. In this case only the information collected about the camera motion is used; the image of the RGB camera integrated into the system is not needed.

By means of the system according to the invention, tracking the elements of the space and the movements of the actors, the knowledge of their current spatial positions can be used preferably.

The object moving in the space of the recording may be tracked (this is the so-called foreground tracking). If, for example, a car moves across the picture, in the knowledge of the current position thereof, the registration plate e.g. can be replaced. The new registration plate is to be inserted in its place in a single frame only and it remains in place throughout, covering the registration number intended to be replaced. This means that if a virtual object is inserted into the dynamic three-dimensional model at a given discrete time, it will automatically stay in its place at the subsequent discrete times. Or, the advertising logo on the side of a car passing in the shot can be deleted, if the logo is covered in one frame by a logo less plane corresponding to the colour of the car and it remains in place throughout, covering the undesired logo.

Tracking of actor movements, so-called motion capture or skeleton tracking may also be applied. A skeleton inserted into the image according to the actor's position is manipulated by the system according to the actor's movements. By means of this, the system is able to automatically animate a humanoid 3D character rig (if the actor is a dog, then a four feet 3D character rig), on the basis of the motion of the actor playing in front of the camera, and the animator does not have to edit the movements of the 3D character rig. The accuracy of the method may be greatly enhanced, if several camera modules working on the dynamic three-dimensional model and synchronised with each other in the system are used, because in this way the actors do not occlude their own movements, which could happen in the case of one camera module. In this case, only the information collected about the actor's motion is applied, and the image of the RGB camera integrated into the system is not needed.

Therefore, by means of the system according to the invention, some of the so-called motion capture methods used today may be replaced.

Knowing their movements in the space of the recording enables the interaction of real space elements and actors with the space, space elements and simulated particle systems generated by computer. For example, the recorded actor or a car moving across the picture may enter a 3D simulated water surface in a way that the computer simulates the movement and waves of the water surface in accordance with the actor or car motions.

The system according to the invention may also be used for depth compositing, by way of example for identifying and separating the foreground and the background. If information is only available about the camera position, like in the cases above, the objects placed into the space of the recording are seen from a position corresponding to the camera location, but the user must decide whether out of the space elements in the space of the recording or out of those generated by the computer, which is nearer or farer. Which element occludes the other, and which element moves into the occlusion of the other. If, for example, in a real environment, a table stands between the shooting camera and the wall representing the background and the intention is to insert a computer generated element let's say an animated figure behind the table, by a hand-drawn mask animated frame by frame in the case of a moving camera, the table must be separated by the known method of rotoscopy. Hence, according to the known solution, the recording is broken down into two layers, a foreground and a background layer, and then the animated 3D figure is inserted between the two layers with the appropriate parts of the figure occluded by the table. By applying the data supplied by the system according to the invention, this is carried out fully automatically, because information is available about where in which depth which element of the recorded image is located in the image, and therefore when a 3D element is inserted, it can be decided without human intervention which image element is in the foreground and which is occluded. This task can be carried out automatically even if the inserted element does not have actual contours, let's say in the case of smoke, fog or liquid generated by a particle simulation system. At the time of recording, the elements further away from the camera are better occluded by the smoke in this case than those nearer to the camera.

On the basis of depth information of an appropriate resolution, the use of a homogeneous background ('green/blue screen' introduced earlier) can also be avoided. In this case the system separates from the background the actors and other elements moving in the picture according to the depth information and not according to the colour. This largely facilitates the use of the system according to the invention compared to the known solutions. It is ab ovo not necessary to build a homogeneous background or to have a special stage with this background for the shooting, the operator does not have to consider the background in lighting, the blue or green background does not appear in the reflections, and the background does not cast any reflection on the actors and elements intended to be separated. The deletion of this reflection (spill suppression) is a serious problem, because on a certain level the methods used influence the colour world of the whole recording, for example in the case of using a green background, the colour is shifted to magenta. And, it is not necessary to make sure either that actors moving in front of the homogeneous colour background do not wear clothing of an identical or similar colour to that of the background.

In the system according to the invention, various light effects may also be used. The most obvious example is reflection. If, lacking space information, it is desirable to reflect an actor separated from the homogeneous background on the computer generated background floor where the actor walks, it can be done in a known way by turning the separated RGB image by 180 degrees, and using a hand animated distortion frame by frame. The result in certain cases, if, e.g., the actor moves on the floor towards or away from the camera, looks unrealistic on the floor anyway. By using the system according to the invention, because information is available about the current spatial position of the actor, a reflection seeming to be realistic can be automatically generated.

A scene can be re-lit subsequently under certain limits on the basis of the space information provided by the system according to the invention (relighting). New light sources and lighting effects may be inserted into the image, and they will realistically illuminate the fixed and moving elements of the space. Even a moving and animated light source, for example, a fairy flying among the space elements of the recording can be inserted into the image, with the fairy dispersing sparkling mica powder in space. Light sources added subsequently not only change the light conditions of the recorded space, but also on the basis of the depth information provided by the system according to the invention, the shadows cast by the elements in space may also be calculated automatically.

By means of the system according to the invention, it is also possible to change subsequently the characteristics of the recording camera. On the basis of the space data, it can be determined arbitrarily which parts of the image at which depth should be blurred or sharp, and which point or depth of the space should the camera focus on. This focal plane can be arbitrarily narrowed, broadened or relocated. For example, the sharpness can be subsequently transferred from one actor to another located at different depths.

Since the camera related displacement velocity and direction of all visible points of the recorded and matched virtual space are known, this can be described by motion vectors. By using the motion vector, motion blur that seems to be realistic can be subsequently generated in the image. This plays an important role indeed, if it is intended to change subsequently the speed of moving the camera. If, for example, it is desired to accelerate the camera motion, a result that seems to be realistic may not be achieved without subsequently adding the motion blur, and the image seems to be jagged, because the quickly moving elements remain unrealistically sharp. On the basis of the space and motion information, the camera may even be slowed down subsequently. To this end, further frames must be calculated in addition to the existing ones. If, for example, the speed is slowed to one half, twice as many frames are needed as the number available, consequently a new one must be generated between each two existing frames. Intermediate frames may even be generated today by the use of clever algorithms. However, they are unable to separate a real movement in space from other changes in the image. For example, if a light is switched on in the image, the change caused by this is taken as a movement, and in such cases false intermediate frames are calculated. By the space and movement data provided by the system according to the invention these anomalies can be eliminated and intermediate frames not existing in the original recording can be established with a much lower calculation effort.

From an appropriately recorded material, the trajectory of cameras moved at different times but roughly on an identical trajectory in space can be synchronised, and as a result with a consistent camera track design, some very expensive apparatuses, the so-called motion control cameras enabling the repeated and unchanged covering of the camera track may be replaced in most areas. Therefore, such a ghost effect may be generated when the picture of the actor moving in the foreground is seen to be semi-transparent through the moving camera.

The system according to the invention may have real-time (online) uses in a virtual studio environment. The system allows it to be used as a virtual studio camera for conducting a live and virtual reality transmission. This means that from a studio having a homogeneous colour background, live transmission can be made in a way that the homogeneous background is changed in real-time to a background generated by the computer, which makes it unnecessary to build a studio scenery and enables also the use of animated and moving elements and scenes, giving programme makers a very broad creative freedom. These kinds of virtual studios are quite broadly applied today. Thanks to the special characteristics of the system according to the invention, it also enables moving to an external real environment, where live broadcast is made in which the background remains the same, but into the real space various fixed or animated virtual elements are placed (for example infographics and charts supporting the relevant themes), thereby establishing a kind of augmented reality environment. Programmes operating with such a visual approach cannot be seen yet in televisions, exactly because of the currently used camera tracking systems being tied to the studio.

The novelties represented by the system according to the invention may be divided into two parts in this field. The currently applied virtual studio approaches may only be used in real-time camera tracking. From the data supplied by the system according to the invention, the camera track can be obtained in real-time, but in comparison with the current solutions it does not need either an installed external sensor environment or special markers, because the elements and fixed objects in the space themselves serve as markers, and the necessary sensors are comprised by the camera unit. Therefore, the system according to the invention may be called practically an autonomous, integrated camera tracking system. The system according to the invention can be used much more simply and it is cheaper and more flexible than the similar solutions broadly applied.

Contrary to popular studio approaches, the system according to the invention provides data about the recording space in real-time in addition to the camera track. By making use of these data, such visual effects can be implemented in the virtual studio, which is not possible by the current systems. The actor(s) may be placed into complex computer generated spaces with a complicated structure, which function both as a background and foreground without having to define a foreground and background. On the basis of existing depth data about the real recorded space and the virtual space, it can be decided automatically which element of the picture is currently occluded and which is in the foreground. For example, the actor may walk around a virtual object in a way that when he/she is before it, the object is occluded, but when he/she is behind it, the object occludes him/her. Or, an animated sign may be placed on a circular trajectory around the actor, who will occlude it in the appropriate position or the sign will occlude him, if he is in such a position. If the actor stands next to a virtual column, putting one hand in front of and the other behind the column, the column will occlude the relevant hand, while the other hand in the foreground will occlude the column. The actor moving in the virtual space can be inserted into the background in a way which seems real to the viewer, so that he casts a shadow corresponding to the virtual light sources on the elements of the space and the background generated by the computer or is reflected by them in a way which seems to be real. Because the position and movement of both the camera and the elements moving in the space are known, the real actors may interact in real-time with the elements of the virtual space. The actor is able to displace and push objects, elements and particles in addition to influencing the behaviour of particle simulation systems or by his movement he can launch and halt prepared animations and events. By means of the system, the camera may be switched in real-time to virtual, pre-animated camera trajectories. For example, the camera moves away from the actor, switches to a virtual camera track animated in 3D and rushes to another site where it arrives at another actor who has stopped in front of the camera in the meantime.

Actually, all the effects listed above may also be used in real-time, and the only limit is the performance of the computer performing the necessary calculations. A complex particle, for example liquid simulation, cannot be calculated today in real-time yet, and there is no real-time solution nowadays concerning the ray tracing light effect calculations either.

The real-time capacities of the system may also be used in the area of film making (on stage pre-visualisation). For example, in shooting a scene recorded at a real site, the director, operator and crew sees in real-time already during the shooting the computer generated elements and animations to be inserted in the course of post-production, and therefore in view of these factors the picture can be composed, and rhythm of the movement of the actors and the camera can be given. The director may not be surprised during the post-production that let's say the scene is basically good, but in the beginning the camera should have been driven higher, because the 3D figure to be inserted does not fit into the picture.

Among others, the following differences from the approach offered by the Kinect document prevail in the system according to the invention. In the solution according to the Kinect document and furthermore for robust operations, so-called volumetric features are necessary. In our solution, in some embodiments the optical sensor investigated textural features that can be well separated and tracked are involved, and the information provided by the tilt sensor, respectively, and if no such textural feature and/or tilt sensor information is available, then the object image can be treated as identical even in the case of various situations (e.g. in the case of a large white wall). It may happen in the case of a previously prepared dynamic three-dimensional model that e.g. during shooting a dynamic object (e.g. a bus) fills the picture, in which case the data of the model do not contribute to estimating the camera position and orientation. This is assisted in some embodiments by the tilt sensor, on the basis of the information of which the position and trajectory of the camera can still be well estimated.

As discussed above, in certain embodiments the system according to the invention provides the following principally in real-time, by online feedback. It supplies accurate data about the current camera position and orientation, so that the system by itself is sufficient to meet the requirements of virtual studio systems. It provides information about the space recorded by the camera module, which information is less worked out and has an approximate character, but is sufficient for showing on the display of the camera module, i.e. for a basic level three-dimensional matching. It prepares a so-called 'garbage mask' based on spatial data to enable the separation of the foreground and background. It gives feedback on an on-going basis about the areas recorded by the camera module, and projects this to the camera RGB output, i.e. display.

In some embodiments of the system according to the invention, it may provide the following. It prepares an accurate and dense point cloud (world model) describing the recorded space well within the effective range of the depth sensor, and furthermore integrates in a global point cloud the space data of recordings made at different times in the recording space. It separates the moving and fixed elements present in the recording space, and it is able to handle them in separate layers. From the point cloud of either moving or fixed elements selected by the operator, it generates an accurate inclusive mesh describing the point cloud well and consisting of a limited number of planes, i.e. it generates a 3D object through the mesh. By making use of the RGB image of the camera module, and re-projecting it to the mesh generated on the basis of the recording space, it is able to obtain automatically or under operator control a texture which is exactly matched to the mesh surface describing the area recorded by the camera. These factors enable the use of the system as a space and object scanner. It performs accurate, automatic lens distortion correction based on space information. These data are published by the software of a respective embodiment of the system according to the invention on the basis of some kind of industrial branch standards (e.g. Collada, FBX, EXR, etc.), so that they can be used by the composite and 3D animation software products in the market.

The invention is, of course, not limited to the preferred embodiments described in details above, but further variants, modifications and developments are possible within the scope of protection determined by the claims.

The invention claimed is:

1. A system for generating a dynamic three-dimensional model of a space, the system comprising:
    a camera module comprising:
        an optical sensor that records image information of the space, and
        a depth sensor that records depth information of the space,
    a modelling module that generates the dynamic three-dimensional model of the space based on the image information and the depth information,
        the camera module being configured so that the image information recorded with the optical sensor and the depth information recorded with the depth sensor are recorded at a plurality of discrete times,
    a synchronization signal generating module that determines the discrete times associated with the image information and the discrete times associated with the depth information synchronously with each other; and
    a base module that generates the dynamic three-dimensional model at the plurality of the discrete times of the image information and of the depth information and at each of the discrete times when the dynamic three-dimensional model is supplemented with new image information and new depth information, and integrates the image information and the depth information associated with a given discrete time into the dynamic three-dimensional model based on a position and an orientation of the camera module at the given discrete time, the position and the orientation being determined by the modelling module based on information provided by the depth sensor and the optical sensor of the camera module at the discrete times in an observation window,
    wherein the observation window comprises, for the given discrete time of the dynamic three-dimensional model, at least one discrete time preceding the given discrete time and at least one discrete time subsequent to the given discrete time, the at least one discrete time subsequent to the given discrete time causing a delay in the integration of the image information and the depth information associated with the given discrete time.

2. The system according to claim 1, wherein the position and the orientation taken by the camera module at each discrete time is determined based on a probability in accordance with the information obtained by the sensors of the camera module.

3. The system according to claim 1, further comprising:
    a display adapted for visualizing a preview of the dynamic three-dimensional model; and
    a rendering module adapted for generating the preview from the dynamic three-dimensional model.

4. The system according to claim 3, further comprising:
    a composite module that supplements the dynamic three-dimensional model with at least one virtual object,
    wherein the preview is generated from the supplemented dynamic three-dimensional model by the rendering module.

5. The system according to claim 1, further comprising:
    a preprocessing module adapted for preprocessing the image information and the depth information.

6. The system according to claim 5, wherein the preprocessing module performs lens distortion correction on the image information.

7. The system according to claim 5, further comprising:
    a stereo camera for recording additional image information at discrete times synchronized with each discrete time associated with the image information and with each discrete time associated with the depth information, and performing period resolution on the depth information on the basis of the additional image information, the stereo camera comprising two additional optical sensors.

8. The system according to claim 5, wherein the preprocessing module performs depth-dependent smoothing.

9. The system according to claim 1, wherein the optical sensor and the depth sensor are arranged essentially along an optical axis by beam-splitter optics.

10. The system according to claim 1, wherein the camera module further comprises a tilt sensor determining the orientation of the camera module for recording tilt information applicable for determining the position and the orientation of the camera module taken at each discrete time.

11. A method for generating a dynamic three-dimensional model of a space, the method comprising:
    recording image information of the space by an optical sensor of a camera module at a plurality of discrete times;
    recording depth information of the space by a depth sensor of the camera module at the plurality of discrete times;
    generating a dynamic three-dimensional model of the space by a modelling module;

synchronizing the discrete times associated with the image information and the discrete times associated with the depth information based on a synchronization signal: and generating the dynamic three-dimensional model at the plurality of discrete times of the image information and of the depth information, and at each of the discrete times when the dynamic three-dimensional model is supplemented with new image information and new depth information;

integrating the image information and the depth information associated with a given discrete time into the dynamic three-dimensional model based on a position and an orientation of the camera module at the given discrete time, the position and the orientation being determined by the modelling module based on information provided by the depth sensor and the optical sensor of the camera module at the discrete times in an observation window, wherein the observation window comprises, for the given discrete time of the dynamic three-dimensional model, at least one discrete time preceding the given discrete time and at least one discrete time subsequent to the given discrete time, the at least one discrete time subsequent to the given discrete time causing a delay in integration of the image information and the depth information associated with the given discrete time.

* * * * *